United States Patent
Choksi

(10) Patent No.: US 7,328,042 B2
(45) Date of Patent: Feb. 5, 2008

(54) ARCHITECTURE FOR FACILITATING GROUP SESSIONS ACROSS DISPATCH OPERATORS

(75) Inventor: Ojas Thakor Choksi, Herndon, VA (US)

(73) Assignee: Nextel Communications Inc., Overland Park, KS (US)

(*) Notice: Subject to any disclaimer, the term of this patent is extended or adjusted under 35 U.S.C. 154(b) by 210 days.

(21) Appl. No.: 11/223,228

(22) Filed: Sep. 9, 2005

(65) Prior Publication Data

US 2006/0058007 A1    Mar. 16, 2006

Related U.S. Application Data

(63) Continuation-in-part of application No. 11/047,897, filed on Feb. 1, 2005, which is a continuation-in-part of application No. 11/047,892, filed on Feb. 1, 2005.

(60) Provisional application No. 60/608,113, filed on Sep. 9, 2004, provisional application No. 60/608,131, filed on Sep. 9, 2004, provisional application No. 60/608,117, filed on Sep. 9, 2004, provisional application No. 60/608,126, filed on Sep. 9, 2004, provisional application No. 60/608,110, filed on Sep. 9, 2004.

(51) Int. Cl.
*H04M 1/00* (2006.01)

(52) U.S. Cl. ............ 455/552.1; 455/518; 455/553.1; 455/406

(58) Field of Classification Search .......... 455/406, 455/507, 432.1, 450, 445, 560, 519, 518; 370/312, 7.46, 299
See application file for complete search history.

(56) References Cited

U.S. PATENT DOCUMENTS

| | | | |
|---|---|---|---|
| 2003/0236093 A1* | 12/2003 | Drozt et al. | 455/450 |
| 2004/0072586 A1* | 4/2004 | Dorenbosch | 455/507 |
| 2004/0082352 A1* | 4/2004 | Keating et al. | 455/519 |
| 2005/0078619 A1* | 4/2005 | McClendon | 370/312 |
| 2005/0192034 A1* | 9/2005 | Munje | 455/458 |
| 2005/0237955 A1* | 10/2005 | Shapira et al. | 370/299 |
| 2006/0046761 A1* | 3/2006 | Bishop et al. | 455/519 |

* cited by examiner

*Primary Examiner*—Tan Trinh

(57) ABSTRACT

An inter-working network facilitating group communications among subscribers spanning a plurality of disparate dispatch networks, a signaling controller, a media gateway, a system for facilitating the monetization of inter-carrier dispatch communications and a group management server. The signaling controller and media gateway generate dispatch call records for dispatch sessions facilitated through the inter-working network. The system includes a billing accumulator and a settlement entity. The billing accumulator is interfaced with the inter-working network and includes logic to receive and store the dispatch call data records from the inter-working architecture. The settlement entity is interfaced with the billing accumulator, and includes settlement logic for converting each stored dispatch call data record to a billing record for each of at least two of the dispatch networks. The group management server is interfaced with group management servers in each of the dispatch networks.

19 Claims, 26 Drawing Sheets

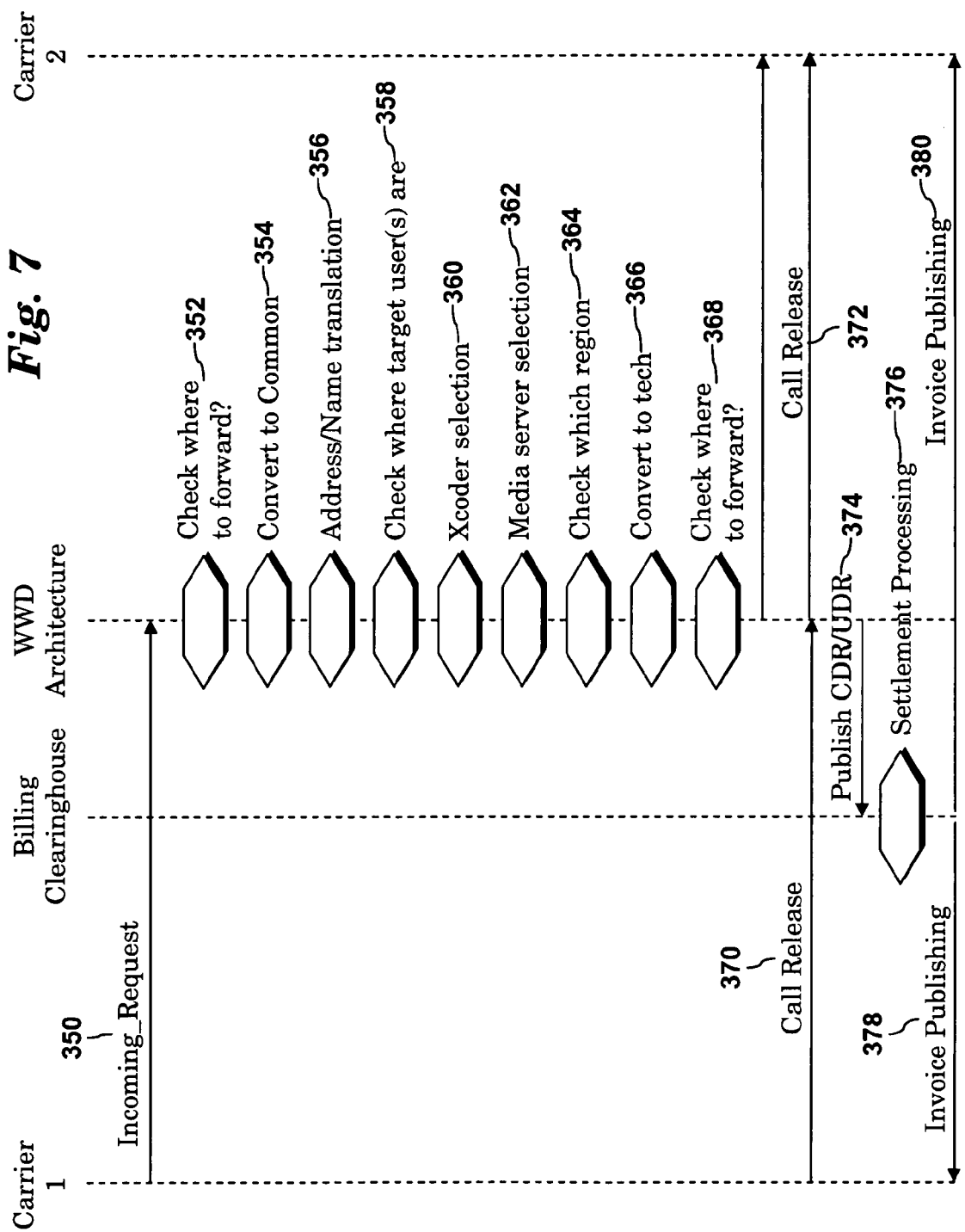

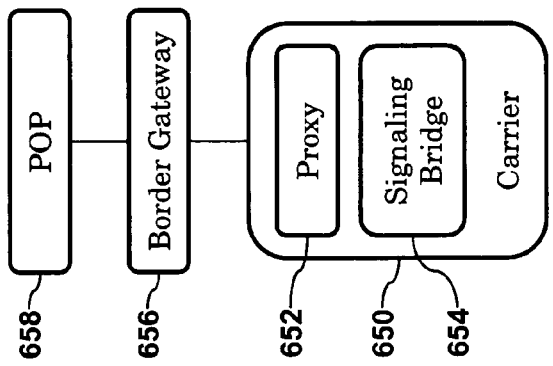
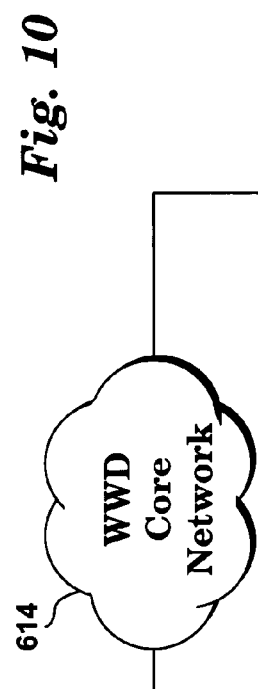
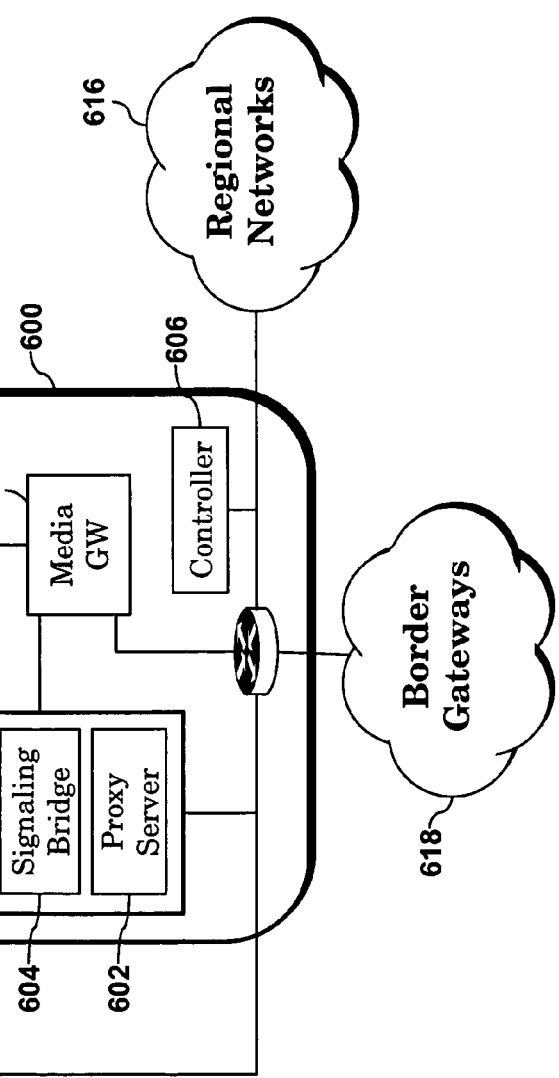
*Fig. 11*
*Fig. 10*

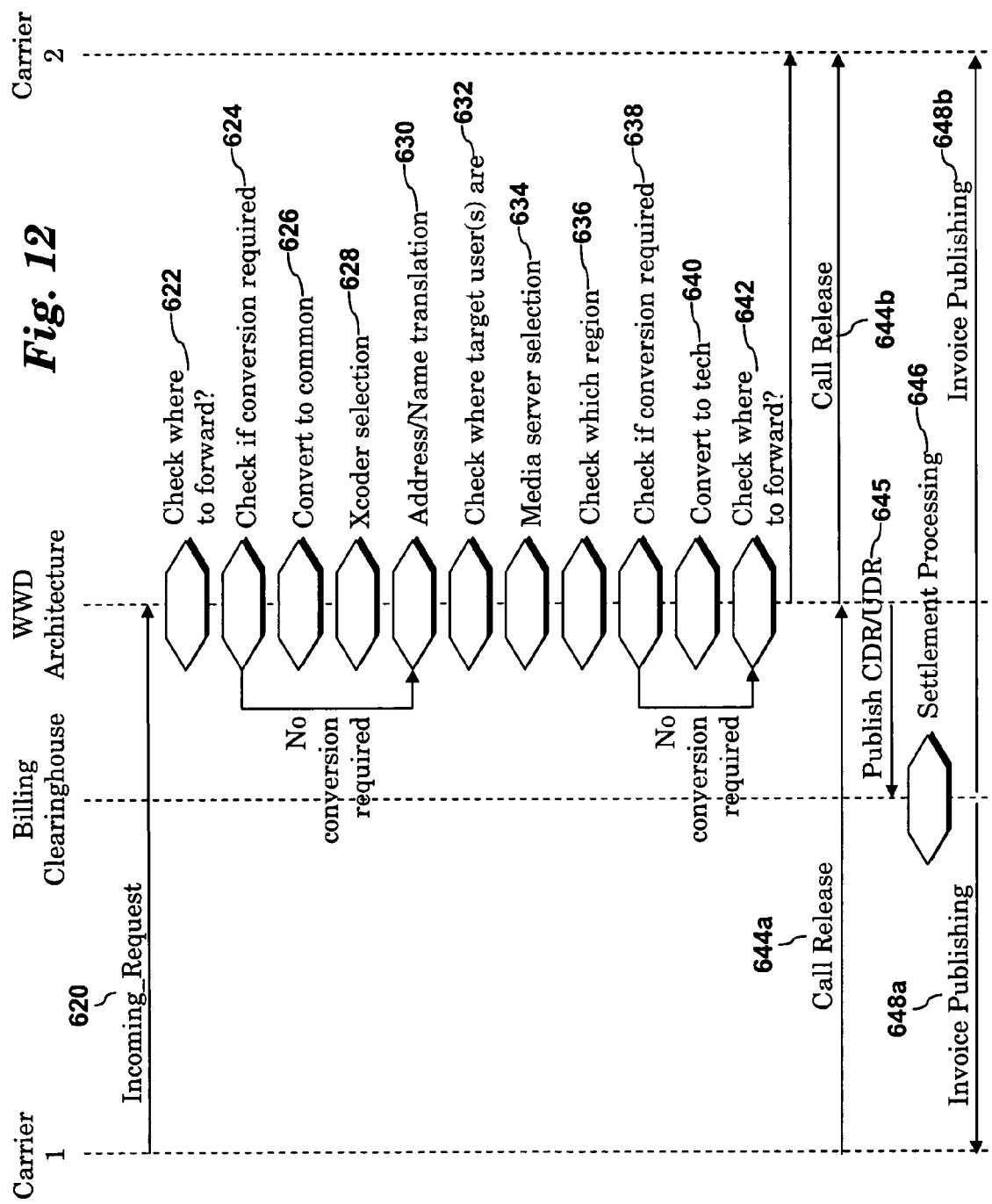

Fig. 13

Carrier 1
- Check where to forward — 670
- Convert to common — 672

Billing Clearinghouse

WWD Architecture
- Address/Name translation — 674
- Check where target user(s) are — 676
- Xcoder selection — 678
- Media server selection — 680
- Check which region — 682

Carrier 2
- Convert to tech — 690

Call Release — 692
Publish CDR/UDR — 694
Settlement Processing — 696
Invoice Publishing — 698

ARCHITECTURE FOR FACILITATING GROUP SESSIONS ACROSS DISPATCH OPERATORS

CROSS REFERENCES TO RELATED APPLICATIONS

The present invention is a continuation-in-part of U.S. patent application Ser. Nos. 11/047,897 and 11/047,892, both of which were filed on Feb. 1, 2005, and claims priority to U.S. Provisional Patent Application Nos. 60/608,113, 60/608,131, 60/608,117, 60/608,126 and 60/608,110, all of which were filed on Sep. 9, 2004, the disclosures of which are incorporated herein by reference.

FIELD OF THE INVENTION

The present invention relates generally to push-to-talk (PTT) wireless communications systems and more particularly to systems and methods for facilitating the monetization of group calls spanning disparate, inter-worked PTT networks.

BACKGROUND OF THE INVENTION

Wireless communications systems are operated worldwide by wireless carriers who charge fees to wireless subscribers for use of the carrier's services such as interconnect, short message service (SMS), packet data and push-to-talk. Each wireless communications system services subscribers within a geographic coverage area and operates using one or more wireless technologies such as code division multiple access (CDMA), global system for mobile communication (GSM), time division multiple access (TDMA) or Advanced Mobile Phone Service (AMPS).

PTT services (also known as a walkie-talkie or dispatch services) are currently offered by some wireless carriers, such as Nextel's Direct Connect® service, and new PTT services and technologies have been proposed. Generally, a PTT call provides near-instant, half-duplex communication between a PTT caller and a target group of PTT users. PTT calls are currently limited to calls between wireless users who use compatible PTT technologies and are subscribers on the same carrier network. For example, subscribers on a network operated by a first wireless carrier cannot engage in PTT calls with PTT subscribers on a network operated by a second wireless carrier.

Proprietary solutions have been proposed to connect two or more PTT networks, but such solutions typically require each PTT network to connect separately to each of the other PTT networks. Many proposed solutions also require extensive modification to, and administration by, each carrier network and are not practical for connecting a large number of wireless carriers and technologies on a worldwide basis. Accordingly, a need exists for an inter-working network architecture that is optimized for PTT communications among subscribers on different carrier networks, irrespective of subscriber and carrier location and underlying PTT technology. A further need exists for an architecture and method to generate revenue for the use of an inter-working architecture and to facilitate revenue sharing and billing between disparate PTT carriers.

SUMMARY OF THE INVENTION

The present invention is a system and method for facilitating the monetization of group calls spanning disparate, inter-worked PTT networks. In one embodiment, a network for inter-working a plurality of dispatch networks having incompatible technologies includes a core inter-working network, a plurality of points-of-presence (POPs) and a plurality of border gateways. The core inter-working network includes an inter-working group server providing group management services between the inter-worked dispatch networks. The core inter-working network further includes a centralized database storing call detail records and usage data reports relating to dispatch sessions implemented across the network, and a billing clearinghouse for receiving the call detail records and usage data reports and generating invoices for each of the dispatch networks. The plurality of POPs are connected to the core inter-working network, and the plurality of border gateways interface each of the dispatch networks to at least one of the plurality of points-of-presence.

In another embodiment, an inter-working architecture facilitates dispatch communications between a group of dispatch devices spanning a plurality of dispatch networks, with each dispatch network having a separate administrative domain and operating on at least one of a plurality of technologies. The inter-working architecture includes a plurality of interfaces facilitating communications with each of the dispatch networks, a signaling bridge, a signaling controller, a media gateway and a group server. The signaling bridge converts session messages and signaling messages between the plurality of dispatch networks. The signaling controller is interfaced with the signaling bridge, the signaling controller manages a dispatch session between an originating dispatch network and at least one target dispatch network. The media gateway is interfaced with the signaling controller to convert real-time media between the originating dispatch network and the target dispatch network. The group server is interfaced with at least one group server in each of the plurality of dispatch networks, and operates to manage inter-working group calls. A billing clearinghouse collects call data for a group session between two or more dispatch networks, reconciles the collected data and creates inter-working invoices for the group session.

In another embodiment, a method facilitates the monetization of inter-working a plurality of disparate dispatch networks, each dispatch network providing dispatch services to a plurality of subscriber units. The method includes receiving a dispatch session request from an originating dispatch network, the dispatch session request identifying a group of the subscriber units spanning a plurality of target dispatch networks and processing, in a point-of-presence, the dispatch session request, including allocating signaling and media resources. The dispatch session request is forwarded to a border gateway associated with each of the target dispatch networks and group session is facilitated between the originating dispatch network and the target dispatch networks. An invoice for each of the participating dispatch networks is generated including charges for facilitating the group session.

BRIEF DESCRIPTION OF THE DRAWINGS

FIG. 7 is a call flow illustrating an operation of the PTT inter-working architecture of the second embodiment;

FIG. 10 illustrates a third embodiment of a PTT inter-working architecture;

FIG. 11 illustrates a fourth embodiment of a PTT inter-working architecture;

FIG. 12 is a call flow illustrating an operation of the PTT inter-working architecture of the third embodiment;

FIG. 13 is a call flow illustrating an operation of the PTT inter-working architecture of the fourth embodiment;

DETAILED DESCRIPTION OF EXEMPLARY EMBODIMENTS

Figure 1:
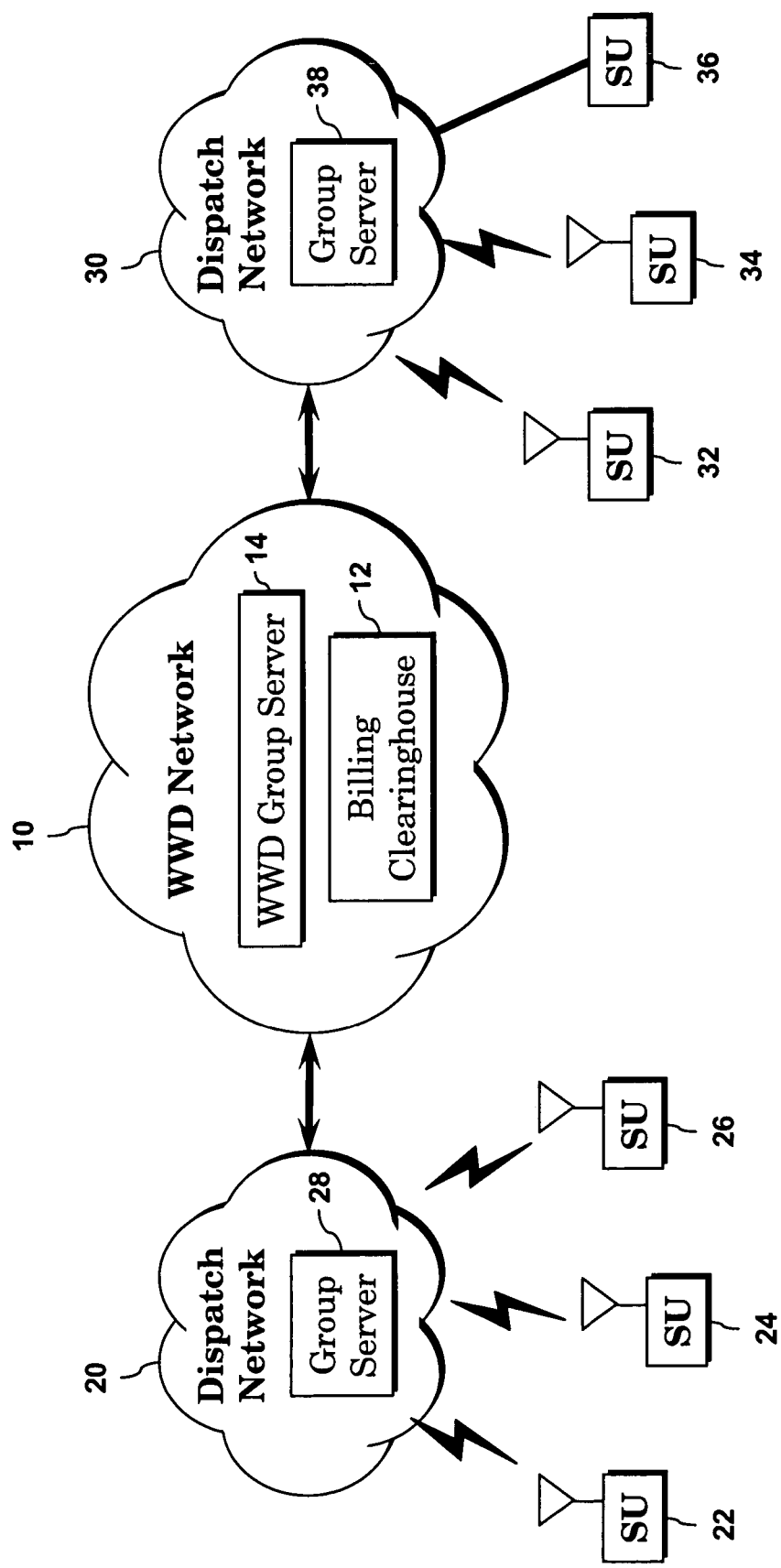
FIG. 1 is a block diagram illustrating a worldwide dispatch network in accordance with an embodiment of the present invention.

An embodiment of a worldwide dispatch architecture of the present invention will now be described with reference to FIG. 1. An inter-working architecture 10, referred to herein as a worldwide dispatch (WWD) architecture, provides a core infrastructure to which dispatch service providers may connect to enable inter-carrier and cross-technology dispatch sessions. The WWD network 10 assists in translating and managing dispatch sessions between a plurality of dispatch networks, such as dispatch network 20 and dispatch network 30, and includes a billing clearinghouse system 12 that stores call detail records (CDRs) and usage data reports (UDRs) to track, bill and provide settlement services relating to the usage of the WWD network 10.

The dispatch networks 20 and 30 may be any communications systems, including wireless and wireline networks, that facilitate dispatch communications between at least two devices. As illustrated, the dispatch network 20 is a communications network that facilitates dispatch calls between a plurality of subscriber units (SU), such as SUs 22, 24 and 26. The dispatch network 30 is a communications network that facilitates dispatch calls between a plurality of subscriber units, such as SUs 32, 34 and 36. The dispatch networks 20 and 30 may be operated by different carriers and may use different dispatch technologies and protocols.

The subscriber units may include any device that is adapted for dispatch communications with one or more of the dispatch networks. For example, the subscriber units may include wireless devices that are adapted to communicate with a dispatch network over a wireless communications link, including mobile telephones, personal digital assistants, and portable computers. The subscriber units may also include wireline devices, such as SU 36, coupled to a dispatch network through a physical connection, such as through the Internet. The dispatch networks may communicate using any of a number of dispatch protocols and technologies such as an Integrated Dispatch Enhanced Network (trademarked by Motorola, Inc. as iDEN® and hereinafter referred to as "iDEN"), a network offering a high performance push-to-talk (HPPTT) functionality, such as the functionality offered by Qualcomm, Inc. under the trademark QChat®, or a PTT over Cellular network (PoC). It will be appreciated that the illustrated embodiment is exemplary and that any number of networks, wireless and wireline devices may be inter-worked to operate with the WWD network 10.

The WWD network 10 further includes a WWD group server 14 managing and facilitating inter-carrier group calls spanning multiple dispatch technologies. The WWD group server 14 maintains a trust relationship with each carrier's group servers 28 and 38, respectively, and disseminates requests for group creation, updates and deletions from the dispatch carriers. The WWD group server 14 brokers propagation of group definitions across the carrier networks, and provides a root repository for group definitions spanning multiple domains.

In operation, a user may initiate a dispatch call with any other users connected to the WWD network 10. For example, user 22 may initiate a dispatch call with users 32 and 34. The dispatch network 20 will recognize that users 32 and 34 are not subscribers of the dispatch network 20 and will forward an initial dispatch request to the WWD network 10. The WWD network 10 determines the address and location of the users 32 and 34, allocates necessary resources for handling the dispatch call, and forwards the initial request to dispatch network 30. The dispatch network 30 processes the initial request and responds to the WWD network 10. The WWD network 10 manages the dispatch session between users 22, 32 and 34 and performs any necessary translation between the formats and protocols of dispatch network 20 and dispatch network 30.

Figure 2:
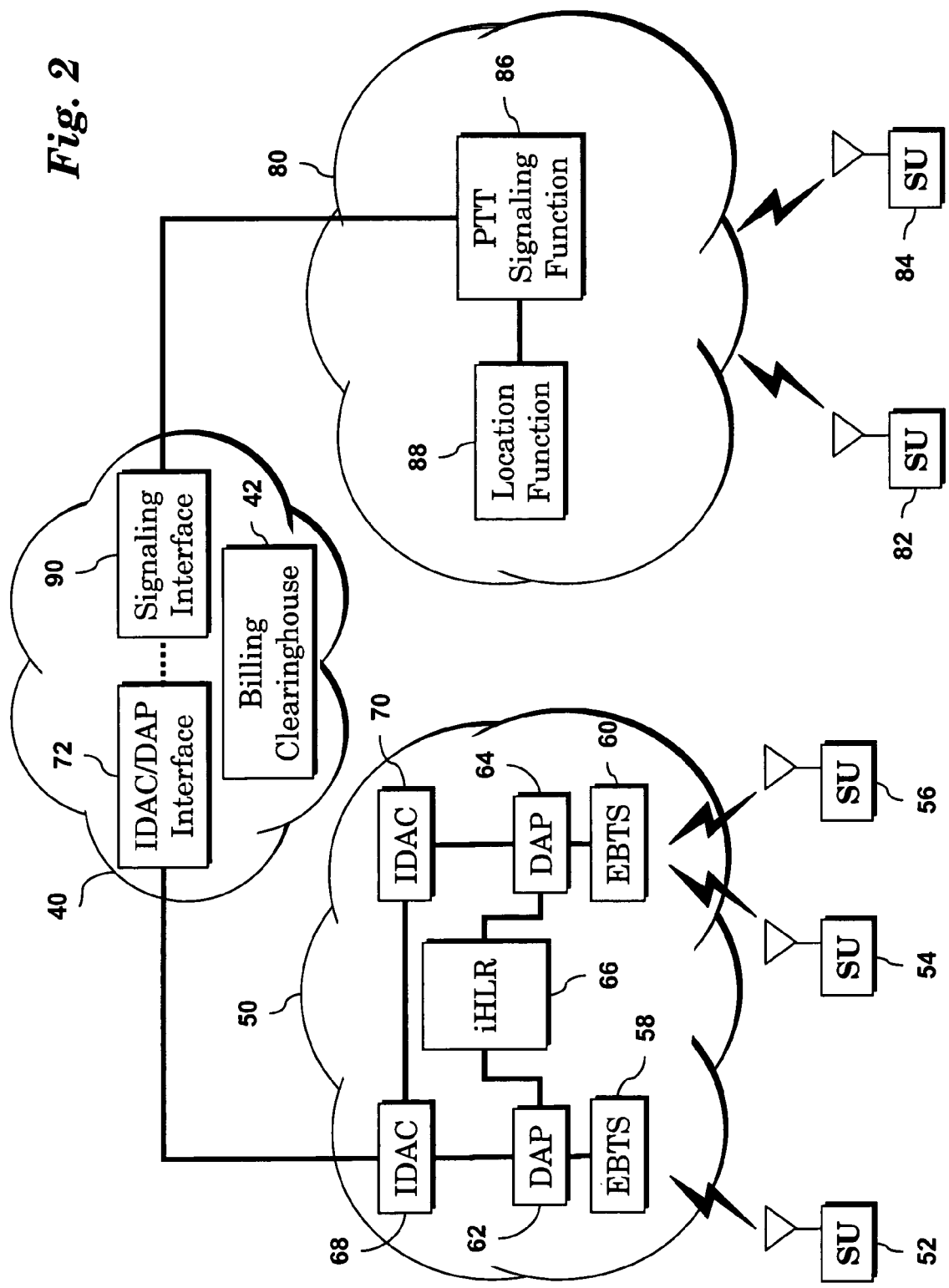
FIG. 2 illustrates functional interfaces between a worldwide dispatch network and PTT networks in accordance with an embodiment of the present invention.

An embodiment of the interface between a WWD and dispatch networks is illustrated in FIG. 2. A WWD network 40 is connected to a plurality of PTT networks, including an iDEN network 50 and a generic PTT network 80. The WWD network 40 includes a billing clearinghouse 42 for the monetization of communications facilitated by the WWD network 40. In an alternate embodiment, one or more PTT networks may be connected to the WWD network 40 via a GPRS Roaming exchange network or CDMA roaming exchange network.

Figure 3:
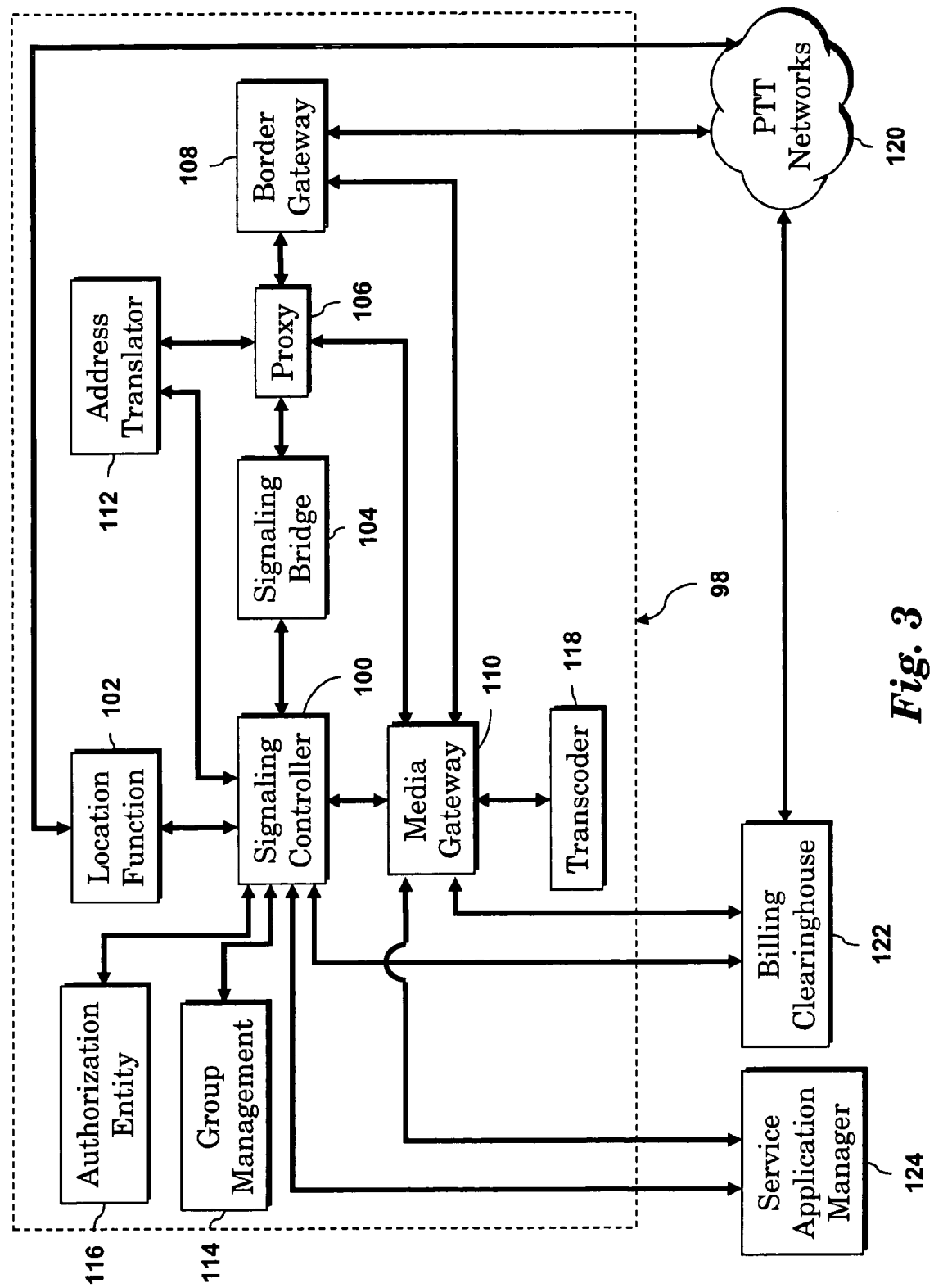
FIG. 3 is a block diagram illustrating functional elements of a worldwide dispatch architecture in accordance with an embodiment of the present invention.

The iDEN network 50 provides wireless PTT services to a plurality of subscriber units 52, 54 and 56. The iDEN network 50 includes a plurality of iDEN base stations known as enhanced base transceiver systems (EBTSs 58 and 60), a plurality of dispatch controllers known as iDEN dispatch application processors (DAPs 62 and 64) and an iDEN Home Location Register 66 (iHLR). The iDEN network 50 may also include a plurality of iDEN dispatch access controllers (iDACs 68 and 70) that facilitate PTT calls across iDEN urban areas. It will be appreciated that the iDEN network 60 illustrated in FIG. 3 is exemplary and that other network configurations can be utilized with the WWD network 40 of the present invention.

In operation, EBTS 58 provides wireless services to the subscriber unit 52, and EBTS 60 provides wireless services to the subscriber units 54 and 56. Subscriber unit 52 may initiate an ad hoc group PTT call with other subscribers on the iDEN network 60, such as subscriber units 54 and 56, by transmitting a PTT request to its local EBTS 60, which forwards the request to DAP 62. DAP 62 interfaces with the iHLR 66 to determine the location of the target subscriber units 54 and 56. DAP 62 (the controlling DAP) next communicates with DAP 64 (the remote DAP) to page the subscriber units 54 and 56, setup the PTT call, and manage the PTT call.

Subscriber unit 52 may also initiate a group PTT call with subscriber units 82 and 84 that are serviced by PTT network 80. In the exemplary embodiment, the location of subscriber units 82 and 84 are not known to the DAP 62 and iHLR 66, and the iDEN network 50 is configured to forward such foreign (or otherwise unknown) PTT targets to the WWD network 40. The iDEN network 50 is connected to the WWD network 40 through an iDAC/DAP interface 72. In this manner the WWD network 40 is seen by the iDEN network 50 as another DAP, i.e., a standard component of the iDEN network. DAP 62 (the controlling DAP) communicates with the iDAC/DAP interface 72 (the remote DAP) to page the mobile stations 82 and 84, setup the PTT call and manage the PTT call. Because the WWD network 40 is seen as a DAP by the iDEN network 50, no further modification of the iDEN network is necessary.

The PTT network 80 interfaces with the WWD network 50 in a similar manner. The PTT network 80 includes a PTT signaling function 86 that manages PTT sessions between a plurality of PTT network subscribers, such as subscriber units 82 and 84. In operation, the subscriber unit 82 may initiate a PTT call to another subscriber on the PTT network 80, such as subscriber unit 84. The PTT signaling function 86 receives the initial PTT request, works with the location function 88 to determine the location of the target subscriber unit 84, forwards the PTT request to the target subscriber unit 84, sets up and manages the PTT call.

The subscriber unit 82 may also initiate a PTT call to a target subscriber unit on a different PTT network, such as subscriber units 52, 54 and 56 on iDEN network 50. In accordance with an embodiment of the present invention, the PTT signaling function 86 is adapted to forward foreign target addresses, such as an address of a user not currently being serviced by the PTT network 80, to the WWD network 40. The WWD network 40 includes a PTT signaling controller interface 90 for interfacing with the PTT signaling function 86. In one embodiment, the signaling interface 90 is seen by the PTT signaling function 86 as a common network element of the PTT network 80, such as a remote signaling controller. The PTT signaling function 86 forwards the session request to the PTT signaling interface 90. The WWD 50, through the iDAC/DAP interface 72 forwards the session request to the iDEN network 50 which processes the request in substantially the same manner as if it came from an internal iDEN DAP.

The WWD network 40 performs the necessary signaling translation between the originating and the terminating legs of a PTT session and ensures that appropriate media resources are allocated to service the PTT session. The WWD network 40 also translates in-session requests including the addition of a member to the PTT call and deletion of a member from a group call. In one embodiment, the WWD network 40 is adapted to translate across talker arbitration protocols implemented by various PTT technology vendors, including via the signaling plane using SIP method(s) and via the bearer plane using extensions to the RTCP protocol.

An embodiment of a WWD architecture will now be described with reference to the functional block diagram of FIG. 3. It should be noted that the functional components in FIG. 3 are not necessarily individual physical components or software modules, and that one or more components may be combined into a single physical component or software module or distributed across a plurality of physical devices and locations. Various physical architectures will be discussed in connection with FIGS. 4-13.

A WWD architecture 98 includes a signaling controller 100 that manages communications across PTT carriers and technologies. The signaling controller 100 is adapted to locate target users from the addresses received from the calling network. The PTT network on which the target user is located is determined via lookup by querying the address translator 112 and the location function 102. In one embodiment, the domain portion of the target user address is used to identify the target PTT network 120. After the PTT networks are identified, a determination is made as to whether transcoding is required between the calling PTT network and target PTT network through a transcoder 118. The signaling controller 100 may also host and manage sessions for roaming subscribers and locate users in a WWD roaming database. It is further contemplated that the signaling controller 100 may perform admission control to prevent unwanted access to the WWC architecture 98 and, with respect to authorized PTT access, enforce restrictions based on resource availability and contractual terms and conditions.

A location function entity 102 is connected to the signaling controller 100. The location function 102 assists in PTT registration of roaming subscribers across PTT networks 120 in the WWD network, tracks the locations of roaming users and notifies the signaling controller 100 of roaming user location for appropriate routing of incoming sessions. The location function 102 also interfaces with corresponding location functions of participating PTT networks to perform registration of roaming subscribers.

A signaling bridge 104 converts session and signaling messages from one PTT technology to another. In one embodiment, each PTT technology is translated into a format that is common across the WWD network based on a static mapping of the applicable network address to the corresponding PTT technology. In one embodiment, the common network protocol is based on SIP (session initiation protocol), with extensions added as necessary to facilitate the communications described herein. Alternatively, the translation may be based on an explicit protocol type embedded in the messages. The signaling bridge 104 is interfaced with the signaling controller 100, which uses the interface to exchange signaling messages with the signaling bridge 104 in a common format.

A proxy 106 analyzes incoming session requests to determine whether the originating and terminating PTT networks use the same PTT technology. If the same PTT technology is used then the proxy 106 facilitates communications between the originating and terminating PTT networks without translation. The proxy 106 is adapted to optimize the latency performance of sessions originating from and terminating to subscribers with the same PTT technology but belonging to different carrier networks. If different technologies are used, then the session is routed to the signaling bridge 104 for translation. In one embodiment, the proxy 106 makes routing decisions based on address translation data received from an address translator 112. Alternatively, the proxy 106 may make routing decisions based on PTT protocol type information embedded in the session header. In one embodiment, the proxy 106 is interfaced with the media gateway 110, and the proxy 106 routes sessions to the media gateway 110 when signaling translation is not required (due to the same signaling format being used between PTT networks), but media translation is required (due to different media formats being used between PTT networks).

A group management entity 114 is connected to the signaling controller 100 for managing inter-network group sessions on behalf of PTT carriers. The group management entity 114 provides group definitions to the signaling controller 100 and brokers and assists in the propagation definition of groups spanning across multiple PTT carriers. The group management entity 114 includes an interface to group management servers associated with one or more of the PTT networks 120. In one embodiment, the group management entity 114 also provides group definitions to a service application manager 124. The service application manager 124 interfaces with the WWD architecture 98 to provide static and dynamic data to PTT applications to process and deliver value added features to subscribers of the PTT networks.

The authorization entity 116 is connected to the signaling controller 100 and operates to manage call restrictions and authorization data for roaming subscribers and session requests to and from subscribers to applications from the service application manager 124.

In one embodiment, the WWD network 98 authorizes PTT sessions at the carrier level, and assumes that a subscriber initiating a PTT session has already been authenticated and authorized by the originating carrier. Access to applications available through the WWD network 98 are also authorized at the carrier level rather than at the subscriber level. In this manner, individual subscribers will not have to register with the WWD network 98 to enable cross-carrier PTT services.

The WWD network 98 is adapted to translate user addresses to identify the terminating network, perform appropriate translation and route the translated sessions to the proper target network. These translation functions are performed by the address translator 112. The address translator 112 provides translation services to the proxy 106 and the signaling controller 100 to map domains into IP addresses to properly route session messages. In the event different naming conventions are used across two or more PTT networks 120, the address translator 112 also provides translation of user addresses. In alternate embodiments, the user address translation may be performed at the signaling controller 100 or the signaling bridge 104. It is further contemplated that individual PTT networks 120 may perform user address translation within the PTT network.

The media gateway 110 is interfaced with the signaling controller 100 and is used to setup media paths, exchange media type and type of transcoding to be done by the media gateway 110. The MEGACO (media gateway control) protocol with enhancements may be used for this interface. The media gateway 110 is also interfaced with the PTT networks 120 to exchange and transport media packets between the WWD network 98 and the PTT network's media gateways.

In one embodiment, the media gateway 110 also performs jitter buffering to minimize the variable delays encountered inside and outside of the WWD administrative domain. The media gateway 110 also performs latency smoothing to avoid floor starvation during a group call spanning two or more carriers. In another embodiment, the media gateway 110 schedules session streams in accordance with service level agreements with associated PTT carriers to ensure appropriate treatment is accorded to the media per the agreements.

The transcoder 118 translates between voice formats to facilitate voice sessions across a plurality of carriers and technologies. The transcoder 118 is used when the end points of a session do not support a common codec. In one embodiment, the transcoder 118 is implemented as part of the media gateway 110.

In the exemplary embodiment, the border gateway 108 is connected to the media gateway 110 via an IP network. The signaling and media traffic between the WWD network 98 and the PTT networks 120 passes through the border gateway 108. The border gateway 108 hosts the necessary trust relationships and related security associations between the WWD network 98 and the PTT networks 120. In one embodiment, the border gateway 108 performs metering, marking, classifying and policing of the traffic traversing the border gateway 108 in both directions in accordance with aggregate carrier service level agreements, which may include multiple levels of quality of service including requirements specifying network availability, latency and packet loss rate and service availability and denial and billing accuracy.

Each PTT network 120 is connected to the WWD network 98 through the border gateway 108. In the exemplary embodiment, IPSEC (IP Security Protocol) association may be the basis of the interface between the border gateway 108 and the PTT networks 120. In one embodiment, a public IP address is assigned to each WWD service element that has an external interface accessible to the PTT networks 120 including: the border gateway 108, the proxy 106, the media gateway 110, the location server 102, the group management entity 114 and the address translator 112.

A billing clearinghouse 122 collects and aggregates UDRs and CDRs from the signaling controller 100 and media gateway 110. The billing clearinghouse 122 includes a settlement function that applies settlement logic to the collected data to perform reconciliation and create inter-carrier settlement invoices for the WWD sessions.

In the exemplary embodiment, each PTT network 120 is assumed to be a separate administrative domain that includes a call control function that manages PTT sessions within the PTT network, a media server, a talker arbitration function for managing floor control during a PTT session, and a group management function for administering group calls. The PTT network may also include other functional entities such as a registration/authentication function to ensure a caller is a valid subscriber, a compression function for efficient utilization of bandwidth, a service discovery function to locate network elements, and a location function for assisting in authentication and a roaming/authorization function.

Figure 4:
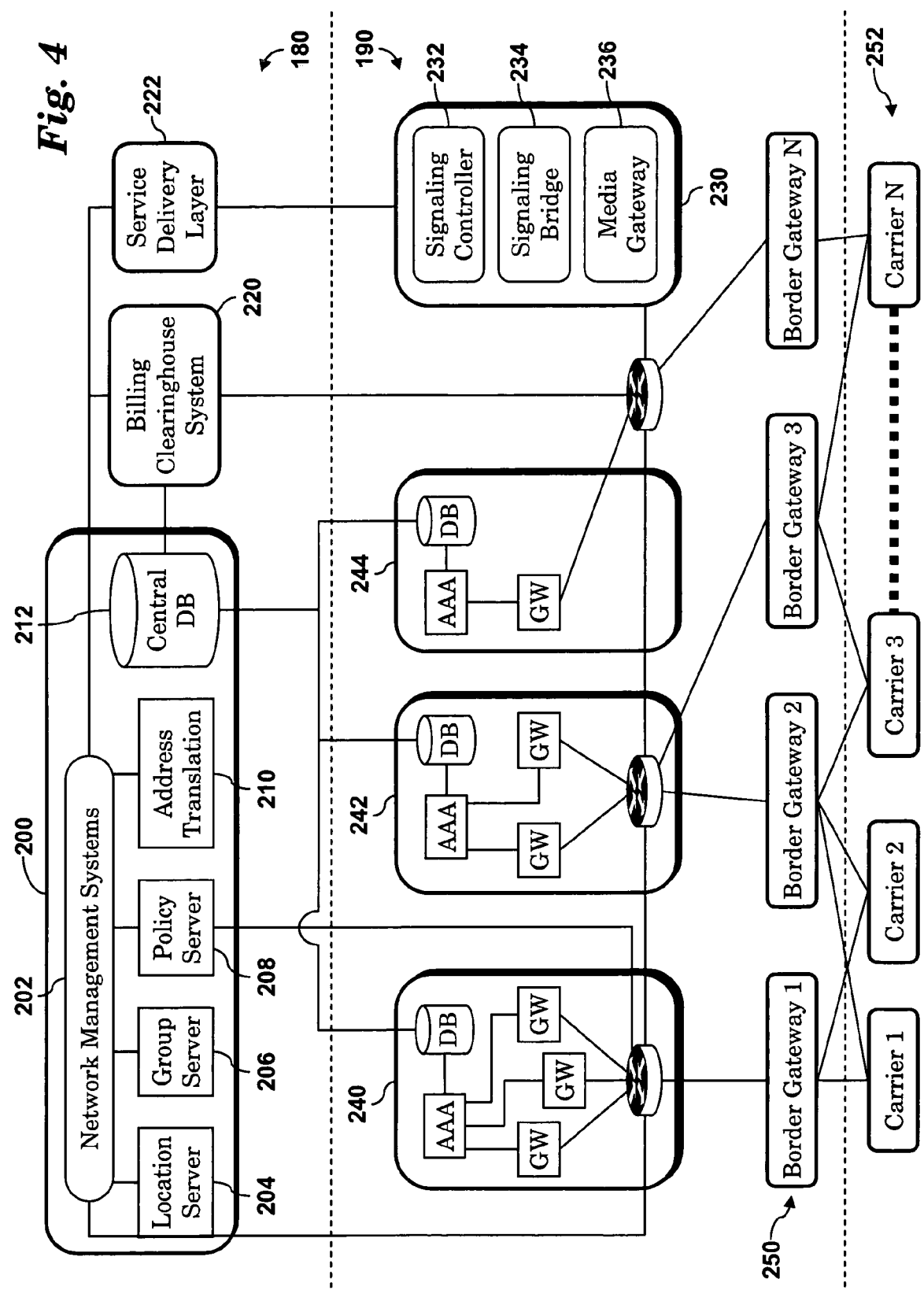
FIG. 4 illustrates a first embodiment of a PTT inter-working architecture.
Figure 5:
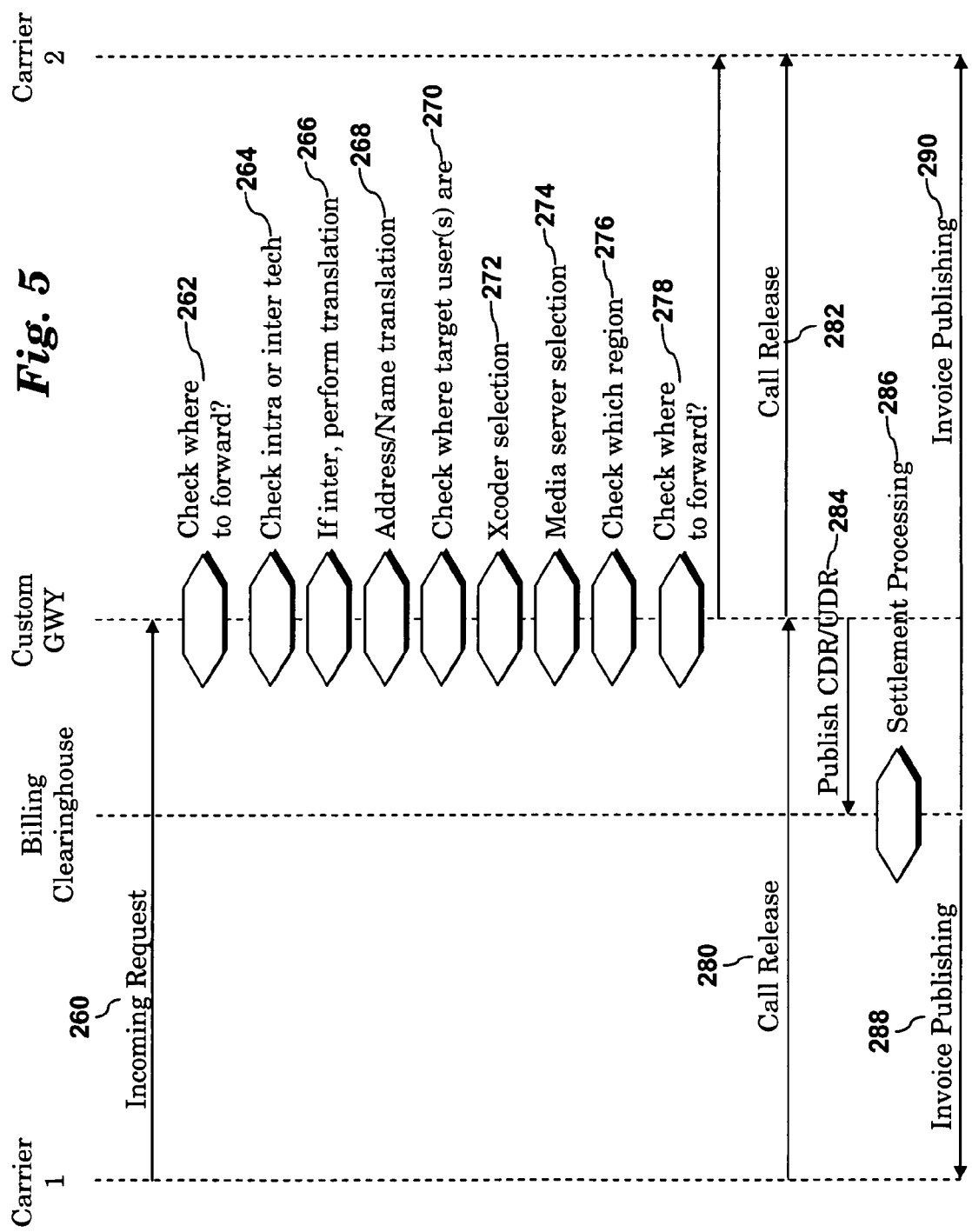
FIG. 5 is a call flow diagram illustrating an operation of the PTT inter-working architecture of the first embodiment.

Referring to FIG. 4, a first embodiment of a physical architecture to facilitate PTT interoperability across wireless carriers with disparate PTT technologies is illustrated. The architecture includes core network components 180 and regional network components 190. The core network components 180 include core inter-working components 200, a billing clearinghouse system 220 and a service delivery architecture 222. The core inter-working components 200 include network management systems 202, a location server 204, a group server 206, a policy server 208, an address translation server 210 and a centralized database 212.

The regional network 190 includes at least one point-of-presence (POP), such as POPs 240, 242 and 244. Each POP 240, 242 and 244 includes at least one custom PTT gateway (GW), an Authentication, Authorization and Accounting function (AAA) and a regional database (DB). The data in each regional database DB is replicated and synchronized with the central database 212. In one embodiment, each custom PTT gateway GW includes a proxy function, a signaling controller, a signaling bridge function for each supported technology and media gateways, as discussed above with respect to FIG. 3.

The carriers 252 may operate across a plurality of regions and connect to the inter-working architecture through a local border gateway 250. The connection between a local border gateway 250 and a carrier may be a leased line, fiber based layer 1 connection; ATM, LAN, Frame Relay based layer 2 connection; an IP VPN based layer 3 connection; or other connection as known to those skilled in the art. In one embodiment, each carrier network 252 also connects to at least one backup border gateway 250. The border gateways 250 route traffic from the carrier's network to a corresponding regional POP associated with the carrier's inter-working vendor.

Each custom gateway GW is adapted to create and forward CDRs to the billing clearinghouse 220, which stores the CDRs for subsequent processing by the settlement function. In one embodiment, to facilitate operation of PTT centric applications through the service delivery architecture 222, an inter-working vendor may include a service delivery interface 230 that includes signaling controller 232, signaling bridge 234 and media gateway 236.

In one embodiment, the carrier PTT networks 252 identify available inter-working gateways through standard discovery mechanisms, such as a DNS query. When participating in an inter-working session, the carrier PTT network is adapted to route the inter-carrier session to the appropriate custom gateway in the WWD network. The custom gateway is adapted to locate the target user(s), select media resources, perform technology translation and forward the session request to the respective carrier(s) of the target user(s).

In operation, a carrier network 252 is adapted to forward WWD requests to a regional POP associated with its WWD network interface. An embodiment of the operation of the architecture of FIG. 4 will now be described with reference to FIG. 5. An incoming WWD request 260 from Carrier 1 may be forwarded through a regional border gateway to a custom gateway in the WWD network. In one embodiment, the Carrier 1 locates an appropriate custom gateway via DNS discovery. The custom gateway may determine whether the session should be serviced by a different custom gateway, such as customer gateway in a different POP, and if appropriate, forwards the request to another custom gateway in step 262 to service the session. The custom gateway determines whether the originating and target technologies are the same (intra-technology call) or different (inter-technology call) in step 264. If the request is for an inter-technology call then the custom gateway translates the request to the target technology and performs necessary address and name translation in steps 266 and 268, respectively. The custom gateway next determines the location of the target users in step 270, selects appropriate vocoders in step 272, selects appropriate media servers in step 274 and determines the regional components serving the target carrier in step 276. The custom gateway next checks where to forward the request and then forwards the request to the appropriate target carrier network, Carrier 2, in step 278.

When the session is complete, the custom gateway releases allocated resources and terminates the PTT session. For example, if the originating caller hangs up, Carrier 1 transmits a call release message 280 to the custom gateway, which transmits a call release message 282 to Carrier 2. The custom gateway collects UDRs from the media gateway, and publishes CDRs and UDRs 284 collected during the session to the billing clearinghouse, which performs settlement processing 286 to allocate charges for the session. The billing clearinghouse subsequently publishes an invoice 288 to Carrier 1 and an invoice 290 to Carrier 2.

Figure 6:
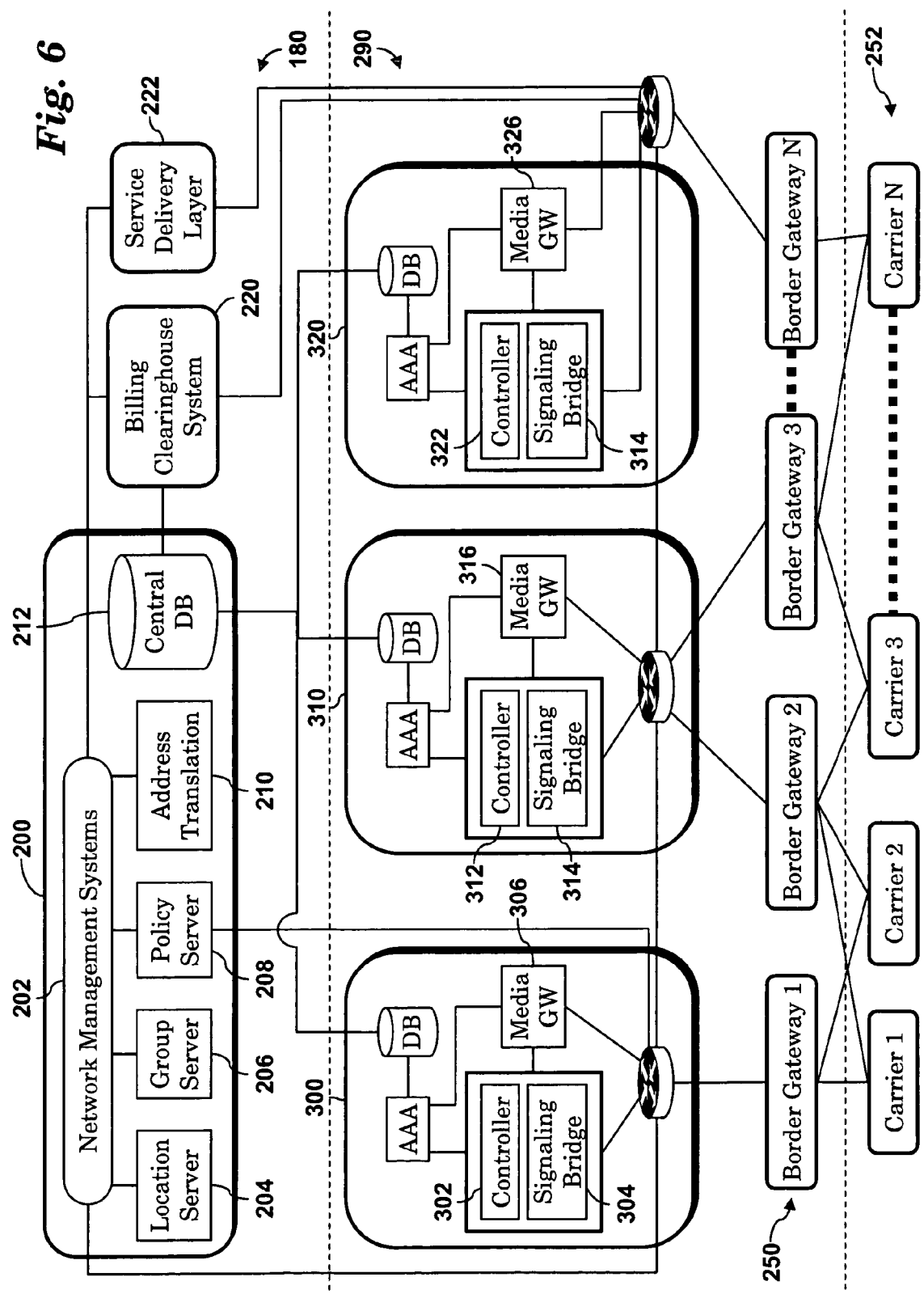
FIG. 6 illustrates a second embodiment of a PTT inter-working architecture.

A second embodiment of an architecture to facilitate PTT interoperability across wireless carriers with disparate PTT technologies is illustrated in FIG. 6. In this embodiment, the originating call is translated into a common signaling format within the WWD network before session processing, regardless of the originating and terminating technologies. After processing, the session is translated into the format of the terminating technology before being forwarded to the called party.

The second embodiment may include the same core network components 180, border gateways 250 and carrier networks 252 of the first embodiment illustrated in FIG. 4. The regional network components 290 include a plurality of POPs, such as POPs 300, 310 and 320. Each POP includes a signaling controller (302, 312, and 322, respectively), a signaling bridge (304, 314 and 324, respectively), and a media gateway (306, 316 and 326, respectively). Since every session is translated into a common format, custom gateways as used in the first embodiment are not required.

An embodiment of the operation of the architecture of FIG. 6 will now be described with reference to FIG. 7. In operation, the PTT networks 252, such as Carrier 1, route incoming WWD sessions to regional inter-working components that service the respective PTT networks. The regional inter-working components translate the incoming session request 350 into a common format used in the WWD network 354. The regional inter-working components process the call and interact with the core inter-working components and other regional inter-working components to perform address translation 356, locate the target users 358, and set up vocoders 360 and media servers 362. Regional inter-working components associated with the terminating carrier, such as Carrier 2, are identified in step 364, the session is translated into the terminating technology format in step 366, and the translated request is forwarded to the terminating carrier in step 368. Because all sessions undergo translation, irrespective of the originating and terminating technologies, the proxy function is not required in this embodiment.

When the session is complete, the WWD architecture releases allocated resources and terminates the PTT session. For example, if the originating caller hangs up, Carrier 1 transmits a call release message 370 to the WWD architecture, which transmits a call release message 372 to Carrier 2. The WWD architecture publishes CDRs and UDRs 374 collected during the session to the billing clearinghouse, which performs settlement processing 376 to allocate charges for the session. The billing clearinghouse subsequently publishes an invoice 376 to Carrier 1 and an invoice 378 to Carrier 2.

Figure 8A:
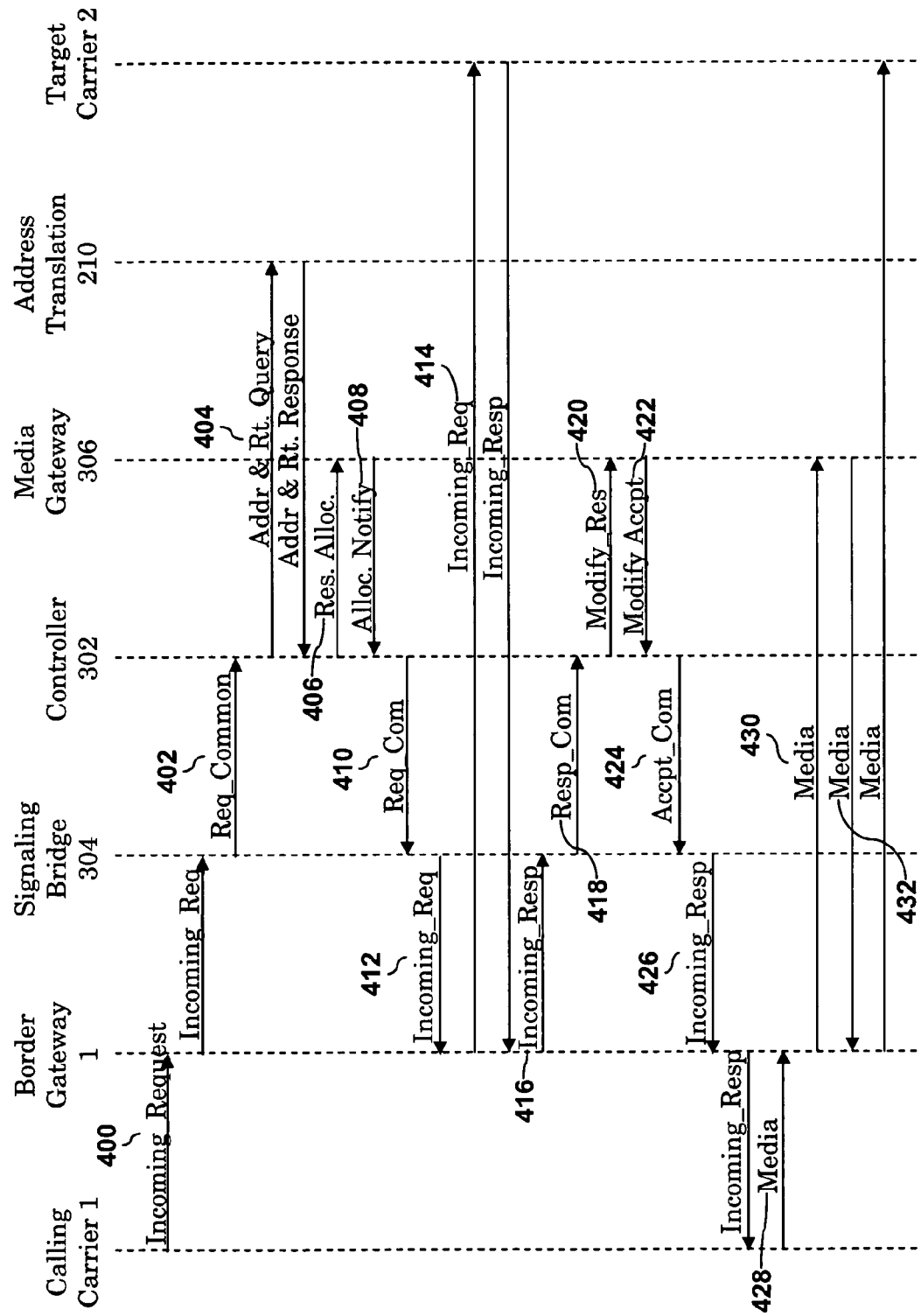
FIGS. 8a and 8b are call flow diagrams illustrating operations of the PTT inter-working architecture in accordance with the second embodiment.

The operation of the inter-working architecture of FIG. 6 will now be described in further detail with reference to the call flows illustrated in FIGS. 8a, 8b, 9a & 9b. FIG. 8a illustrates a call flow for a session traversing a single signaling bridge, controller and media gateway. The originating carrier network 1 initiates an inter-carrier PTT call to a target wireless carrier 2 by transmitting an incoming request 400 to border gateway 1, which forwards the request to signaling bridge 304 of the POP 300. The signaling bridge 304 translates the request to a common WWD format and forwards the translated request 402 to the controller 302. The controller 302 transmits a corresponding address and routing query 404 to the address translation server 210, which provides address and routing information in response. The controller 302 next communicates with a media gateway 306 to allocate the necessary resources to handle the PTT session (messages 406 and 408).

The incoming request is next forwarded to the target mobile carrier 2 in steps 410 through 414. First, the controller 302 transmits the request 410 to the signaling bridge 304, which translates the message from the common WWD format to a format compatible with the target mobile carrier 2, and transmits the incoming request 412 to the border gateway 1. The border gateway 1 transmits the incoming request 414 to the target mobile carrier 2, which responds to the request. The border gateway 1 forwards the incoming response 416 to the signaling bridge 304, which forwards the message in the common WWD format 418 to the controller 302. The controller 302 next communicates with a media gateway 306 to modify the allocated media resources as necessary to handle the PTT session (messages 420 and 422). The controller 302 forwards the accept message 424 to the signaling bridge 304 which translates the message into the format of the originating Carrier 1 and forwards the translated message 426 to the border gateway 1, which forwards the message to the originating Carrier 1.

After the PTT session is setup, the caller may speak into the dispatch device for transmission to the target user. Media packets 428 are transmitted from the calling Carrier 1 to the border gateway 1 which forwards the received media packets 430 to the media gateway 306. The media gateway 306 translates the media packets 430 into the format of target carrier 2 and returns the translated media packets 432 to the border gateway 1, which forwards the media packets to the target carrier 2, and subsequently, to the target dispatch device.

Figure 8B:
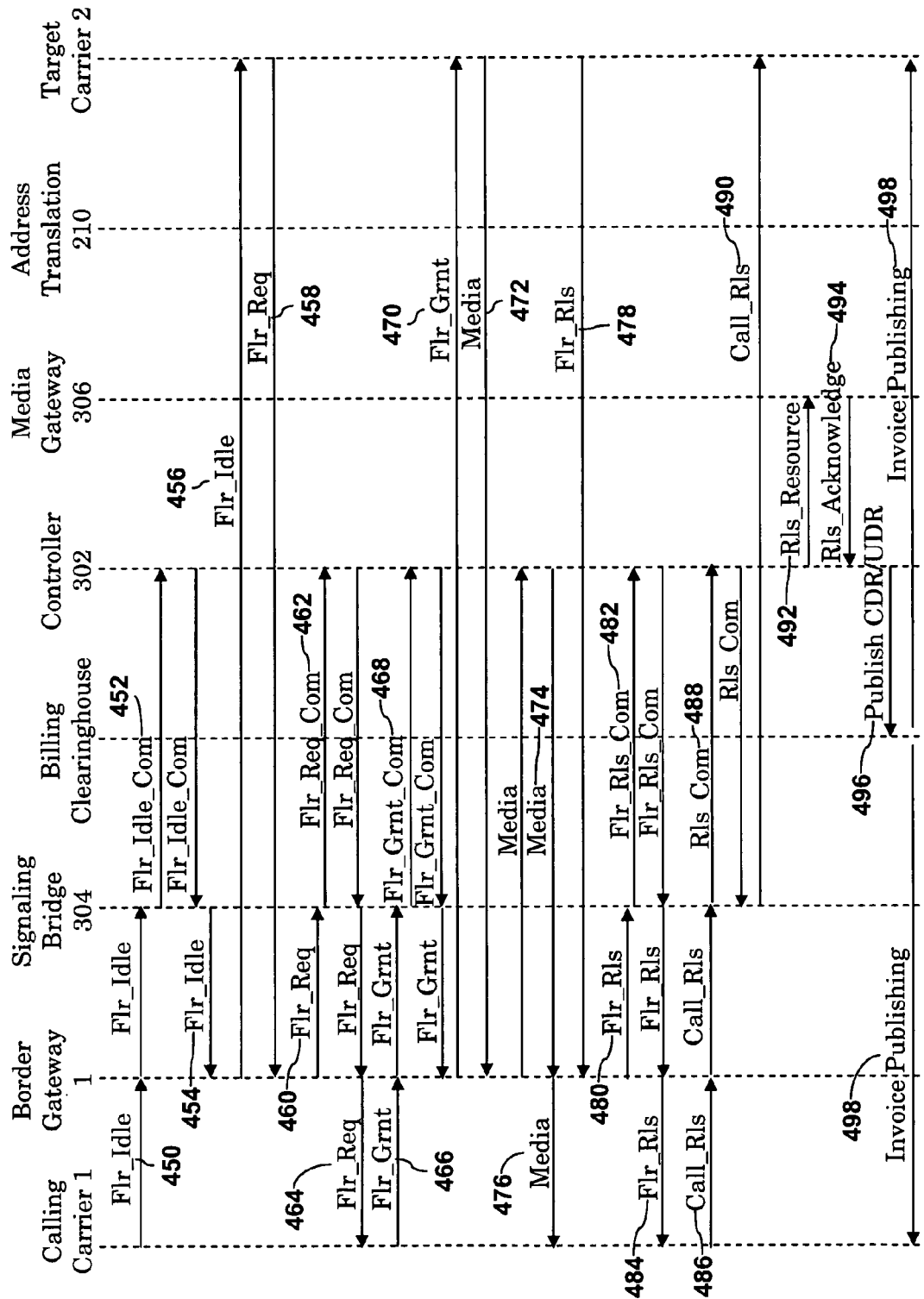

FIG. 8b illustrates a call flow for the session of FIG. 8a in which the target user transmits a voice response to the originating user. After the caller releases the PTT-button on the dispatch device, the calling carrier 1 transmits a flr_idle message 450 to indicate that the caller is relinquishing the floor. The flr_idle message 450 is transmitted to the signaling bridge 304 through border gateway 1. The signaling bridge 304 converts the flr_idle message into a common WWD format 452 used by the POP 300, and forwards the message to the controller 302. The controller 302 forwards the message to signaling bridge 304 for forwarding to the target carrier 2. The signaling bridge 304 translates the flr_idle message from the common format to the format of the target carrier 2, and forwards the translated flr_idle message 454 to the border gateway 1, which forwards the message 456 to the target carrier 2.

The user of the target device may then press the PTT-button on the target device to claim control of the floor and begin speaking. The target carrier 2 transmits a floor request, flr_req 458, to the border gateway 1, which forwards the message 460 to the signaling bridge 304. The signaling bridge 304 translates the message into a common WWD format 462 and forwards the request to the controller 302 which determines that the floor request should be sent to the calling Carrier 1 which is managing the PTT session. The signaling bridge 304 translates the flr_req message into the format of the calling Carrier 1 and forwards the message 464 to the calling Carrier 1 through the border gateway 1.

If calling Carrier 1 grants the floor to the target user, it sends a flr_grnt message 466 to the signaling bridge 304 through the border gateway 1. The signaling bridge 304 translates the flr_grnt message into the common format 468 and the controller 302 determines that the message should be forwarded to the target carrier 2. The signaling bridge 304 converts the message into the format of the target carrier 2 and transmits the flr_grnt message to the target carrier 2 through the border gateway 1. Media packets 472 carrying the target user's speech is received from the target carrier 2 and forwarded to the border gateway 1, which forwards the media to the media gateway 306 for translation into the calling carrier's format. The translated media packets 474 are then forwarded to the calling carrier 1.

When the target user releases the PTT-button, a floor release message, flr_rls 478, is transmitted from the target carrier 2 to the border gateway 1. The flr_rls message 480 is translated into a common format 482 by the controller 302, and then into the calling carrier's format 484 by the signaling bridge 304. Finally, the flr_rls message is transmitted to the calling carrier 1.

When the caller terminates the call, e.g., by hanging up, the calling carrier 1 transmits a call_rls message 486 to the border gateway 1. The message is translated by the signaling bridge 304, forwarded in message 488 to controller 302, and forwarded 490 to target carrier 3 through the signaling bridge 304. When the session is complete, the WWD architecture releases allocated resources and terminates the PTT session. The controller 302 transmits a release resource message 492 to media gateway 306 which returns a release acknowledge message 494. The media gateway 306 forwards UDRs collected during the session to the controller 302. In one embodiment, the UDRs are appended to the release acknowledge message 494. The controller 302 publishes CDRs and UDRs 496 collected during the session to the billing clearinghouse, which performs settlement processing to allocate charges for the session. The billing clearinghouse subsequently publishes invoices 498 to Carriers 1 and 2. In another embodiment, the media servers may publish the UDRs directly to the billing clearinghouse.

Figure 9A:
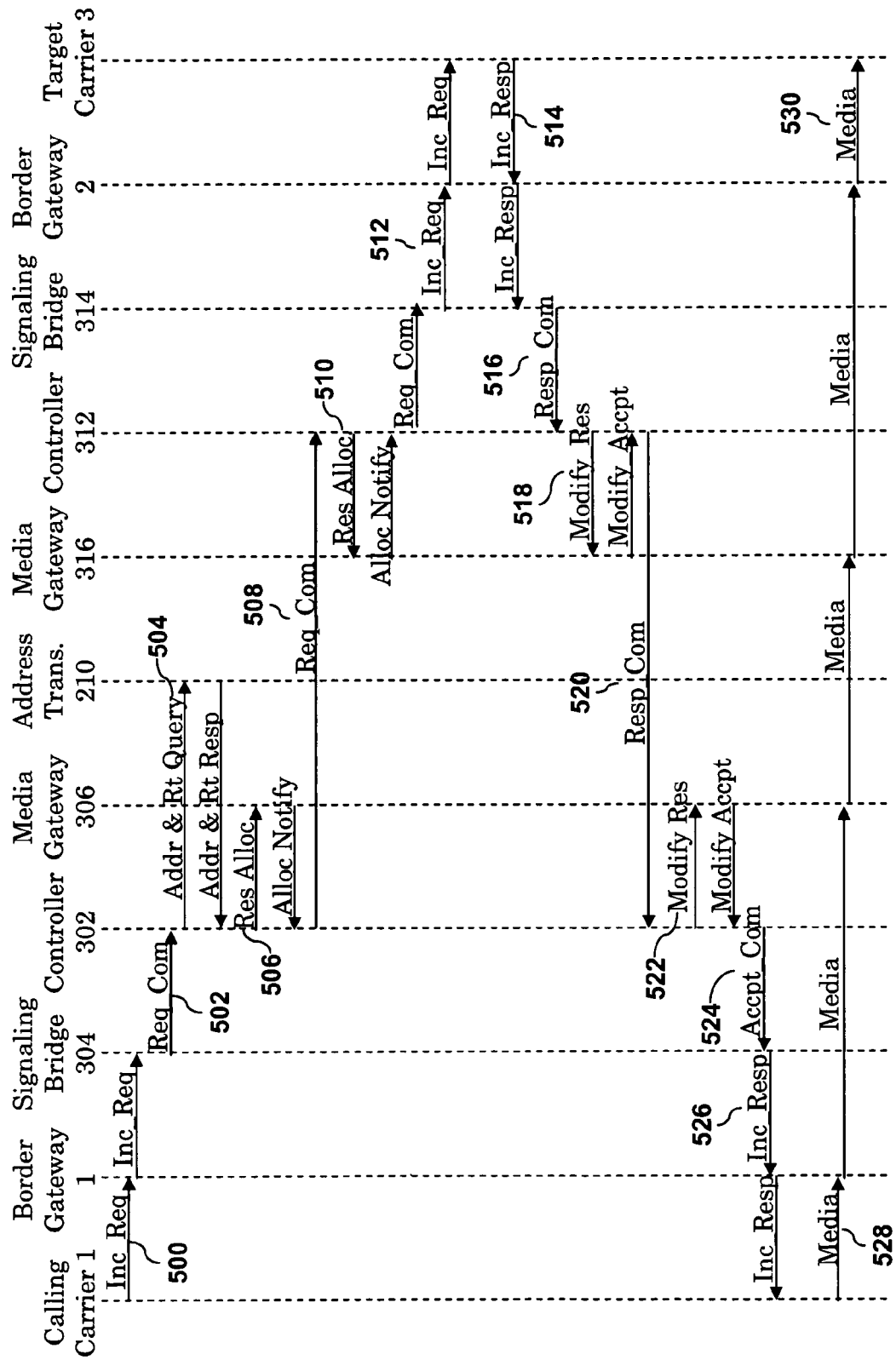
FIGS. 9a, 9b and 9c are additional call flow diagrams illustrating operations of the PTT inter-working architecture in accordance with the second embodiment.

FIG. 9a illustrates a call flow for another embodiment with the session originating and terminating in different signaling and media elements. The originating and terminating elements may be located in the same POP, or in different POPs, such as POPs 300 and 310, respectively. The calling carrier 1 initiates an inter-carrier PTT call to a target carrier 3 by transmitting an incoming request 500 to border gateway 1, which forwards the request to signaling bridge 304. The signaling bridge 304 translates the request to a common inter-working format and forwards request 502 to the controller 302. The controller 302 transmits a corresponding address and routing query 504 to the address translation server 210, which provides address and route information in response. The controller 302 next communicates 506 with the media gateway 306 to allocate necessary resources for the PTT call.

The controller 302, based on the received routing information, transmits the request 508 to controller 312. The controller 312 communicates 510 with the local media gateway 316 to allocate the resources necessary to translate media from the target carrier 3 to the common inter-carrier format. Next, the request is translated to the target carrier 3 format by the signaling bridge 314 and forwarded 512 to the target carrier 3.

The border gateway 2 receives an incoming response from the target carrier 3 and forwards the incoming response 514 to the signaling bridge 314, which forwards the response message in a common format 516 to the controller 312. After receiving the response, the controller 302 sets up media resources within the media gateway 306 by exchanging messages 518. The controller 302 next forwards the response 520 to the controller 302. The response is forwarded 522 to the media gateway 306 which returns an accept message to the controller 302. The response is then forwarded to the calling carrier 1 through the signaling bridge 304, which provides translation, and the border gateway 1.

After the PTT session is setup, the caller may speak into the dispatch device for transmission to the target user. Media packets 528 are transmitted from the calling carrier 1 to the border gateway 1 which forwards the received media packets to the media gateway 306. The media gateway 306 translates the media packets 430 into a common inter-working format and forwards the translated media packets to media gateway 316. Media gateway 316 converts the media packets from the common format to the format of target carrier 3 and transmits the media packets 530 to the target carrier 3 through the border gateway 2.

Figure 9B:
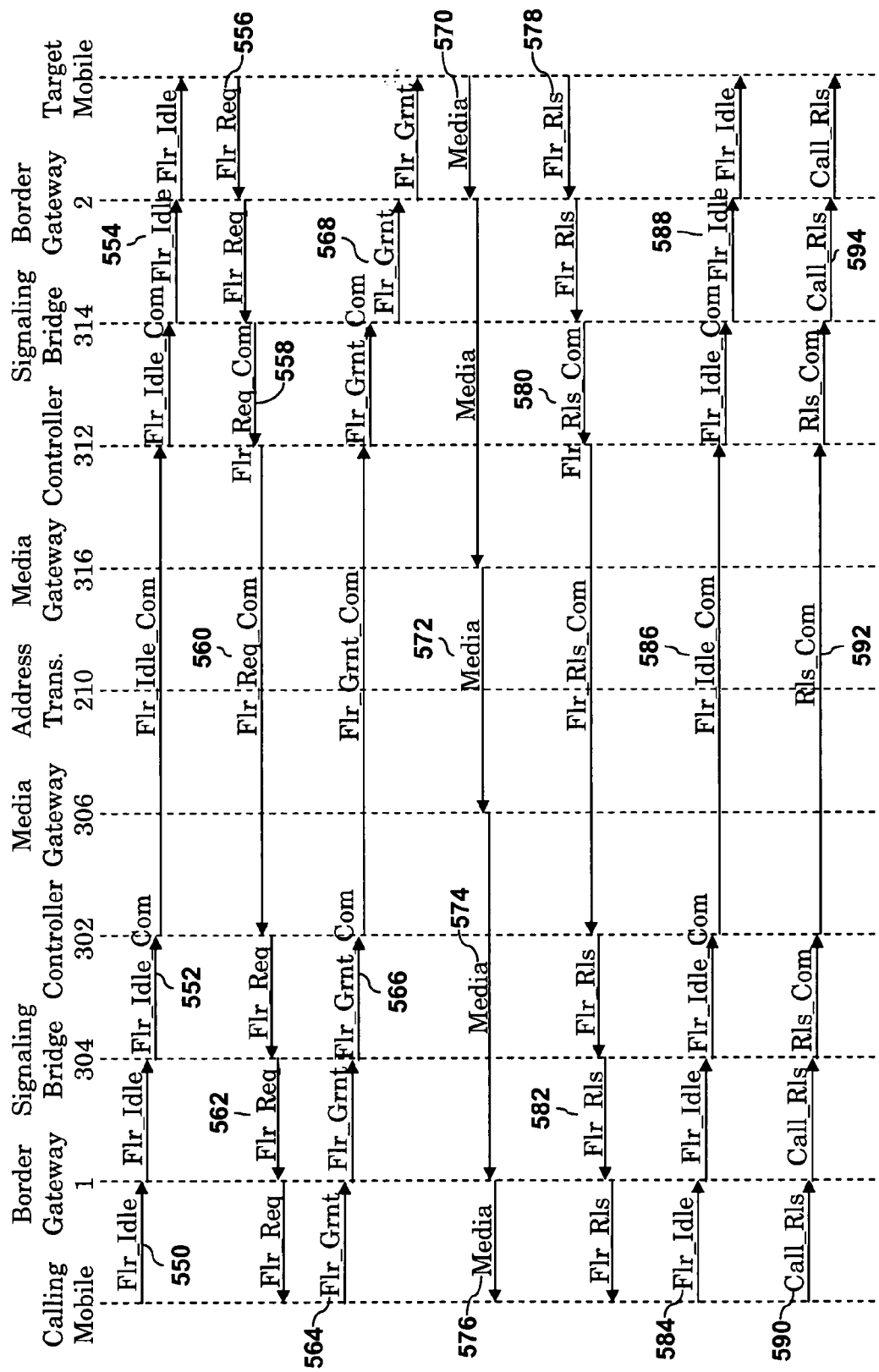

FIG. 9b illustrates a further call flow for the session of FIG. 9a in which the target user responds to the calling dispatch device. When the caller releases the PTT-button on the calling dispatch device, the calling carrier 1 transmits a flr_idle message 550 to indicate that the caller is relinquishing the floor. The flr_idle message 550 is transmitted to the signaling bridge 304 through border gateway 1. The signaling bridge 304 converts the flr_idle message into a common format 552 used by the inter-working architecture, and forwards the message to the controller 302. The controller 302 forwards the message to controller 312 which forwards the flr_idle_com message to signaling bridge 314. The signaling bridge 314 translates the flr_idle_com message from the common format to the format of the target carrier 3, and forwards the translated flr_idle message 554 to the border gateway 2, which forwards the message to the target carrier 3.

The user of the target user may then press the PTT-button on the target user to claim control of the floor and begin speaking. The target carrier 3 transmits a floor request, flr_req 556, to the border gateway 2, which forwards the message to the signaling bridge 314. The signaling bridge 314 translates the message into a common format 558 and forwards the request to the controller 312. Controller 312 determines that the floor request should be sent to the calling carrier 1 which is managing the PTT session and forwards the floor request to the controller 302. The message is then transmitted to the signaling bridge 304 which translates the flr_req message into the format of the calling carrier 1 and forwards the message 562 to the calling carrier 1 through the border gateway 1.

If calling carrier 1 grants the floor to the target user, then it returns a flr_grnt message 564 to the signaling bridge 304 through the border gateway 1. The signaling bridge translates the flr_grnt message into the common format 566 and the controller 302 determines that the message should be forwarded to the target carrier 2. The message is transmitted to the controller 312, translated by the signaling bridge 314 into the format of the target carrier 2 and forwarded to the target carrier 3 through the border gateway 2. Media packets 570 carrying the target user's audio data are received from the target carrier 3 and forwarded to the border gateway 2, which forwards the media to the media gateway 316 for translation into the common inter-working format and then to the media gateway 306 for translation into the format of the calling carrier 1. The translated media packets 576 are then forwarded to the calling carrier 1.

When the target user releases the PTT-button, a floor release message, flr_rls 578, is transmitted from the target carrier 3 to the border gateway 2. The flr_rls message 578 is translated into a common format 580 by the signaling bridge 314 and forwarded to the controller 312. The flr_idle_com message is then forwarded to the controller 302, translated by the signaling bridge 304 into the calling carrier's format 582 and forwarded to the calling carrier 1 through the border gateway 1. As illustrated, the calling carrier 1 then transmits another flr_idle message to the target carrier 2.

When the caller terminates the call, e.g., by hanging up, the calling carrier 1 transmits a call_rls message 590 to the border gateway 1. The message is translated by the signaling bridge 304, transferred between the controllers 302 and 316, translated into the target carrier's technology 594 and forwarded to the target carrier 3.

Figure 9C:
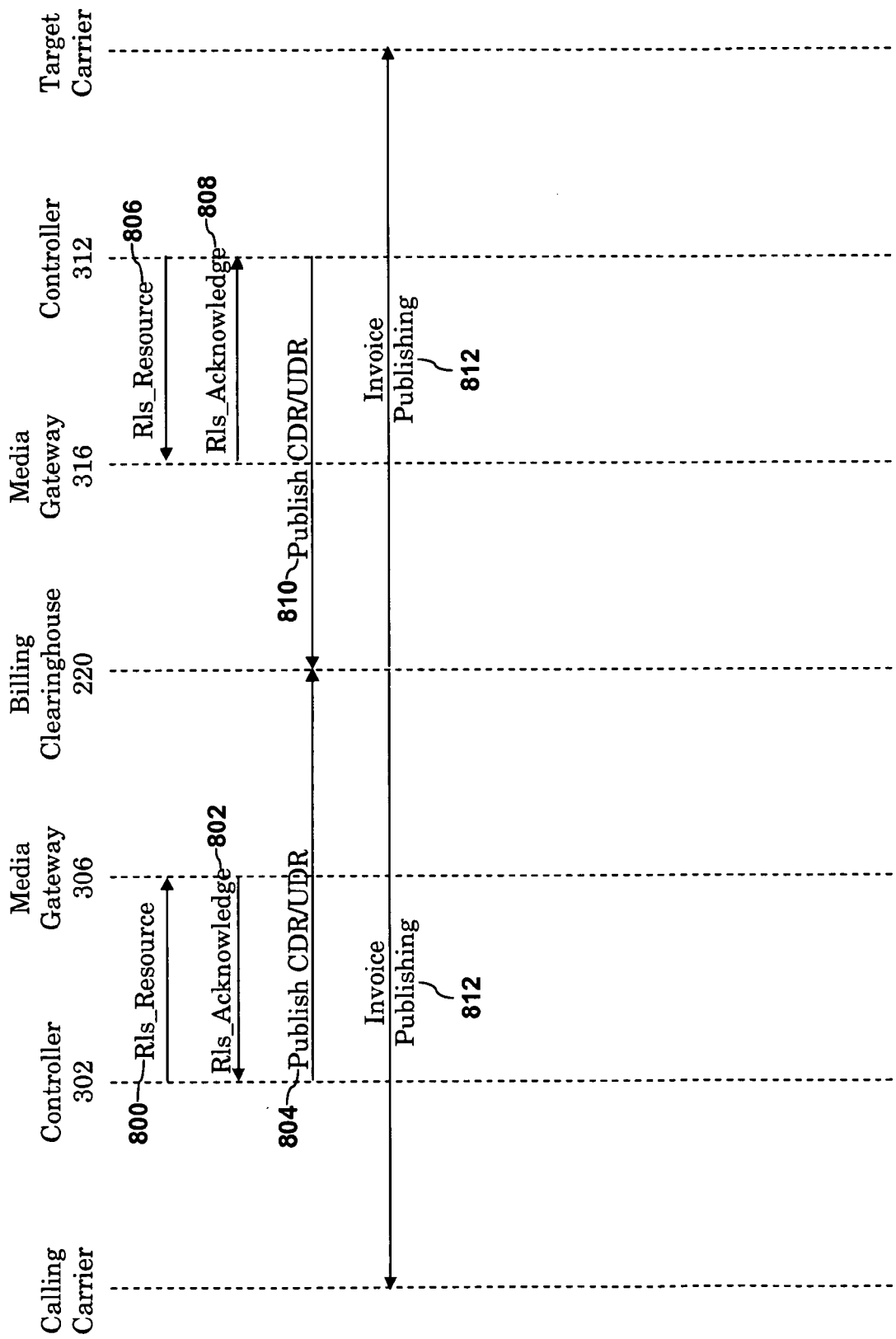

Upon receiving the call_rls message, the elements of the inter-working architecture release allocated resources and terminate the PTT session. Referring to FIG. 9c, the controller 302 transmits a release resource message 800 to media gateway 306 which returns a release acknowledge message 802. The media gateway 306 forwards UDRs collected during the session to the billing clearinghouse 220. In one embodiment, the UDRs are appended to the release acknowledge message 802. The controller 302 publishes the CDRs and UDRs 804 collected during the session to the billing clearinghouse 220, which performs settlement processing to allocate charges for the session. Similarly, controller 312 transmits a release resource message 806 to media gateway 816 which returns a release acknowledge message 808 including UDRs collected during the session. The controller 312 publishes the CDRs and UDRs 810 collected during the session to the billing clearinghouse 220. The billing clearinghouse 220 performs a settlement function to allocate charges for the session and subsequently publishes an invoice 812 to the calling carrier and an invoice 814 to the target carrier.

It will be appreciated that other session configurations and call flow routing may be implemented within the spirit and scope of the present invention. For example, it is contemplated that a PTT session may be implemented in which the PTT signaling is handled via a two signaling controllers but the media bearer paths are setup through a single media gateway.

A third embodiment of an inter-working architecture is illustrated in FIG. 10. This embodiment is similar to the second embodiment illustrated in FIG. 6, but includes a proxy 602 to control whether WWD sessions between carriers will be translated. As illustrated, at least one POP 600 is networked with the WWD core network 614, regional networks 616 and at least one border gateway 618. The POP 600 includes the proxy server 602, a signaling bridge 604, a controller 606, an AAA 608, a regional database 610 and a media gateway 612. By routing session through the proxy 602, sessions between carriers with the same PTT technologies will be implemented without translation into a common protocol. This reduces the call setup and floor arbitration latencies associated with the inter-working calls of the second embodiment.

Referring to FIG. 11, in a fourth embodiment at least one carrier network 650 includes a proxy server 652 and a signaling bridge 654. The carrier network 650 is connected to the WWD network through a border gateway 656 and a POP 658. The proxy and signaling bridge functions are included in the POP 658 (or other POPs) to serve carriers who have not deployed the signaling bridge functionality as part of their PTT infrastructure deployment. In this embodiment, the signaling traffic received from the carrier 650 by the WWD network is already in the common WWD format, as the translation is done by the carrier premises before its gets forwarded to the WWD for further processing. The POP 658 may still determine whether conversion is required, as the session may have originated from a carrier that does not perform its own conversion. The core WWD infrastructure includes the components previously described in other embodiments.

An embodiment of the operation of the architecture of FIG. 10 will now be described with reference to FIG. 12. An incoming PTT request 620 is routed to regional inter-working components of the WWD architecture that service the originating PTT network. The regional inter-working components determine the appropriate WWD architecture components to handle the PTT session request, such as POP 600, in step 622. In step 624, if the PTT session requires translation then the proxy 602 routes the session to the signaling bridge 604 where it is converted to a common WWD protocol in step 626. In step 628, transcoders are selected for the PTT session, and then address and name translation is then performed via the controller 606 and the WWD core network 614 in step 630. If the session does not require translation then the proxy 602 bypasses steps 626 and 628. In step 632, the controller 606 determines the location of the target user(s), and in step 634 media server(s) are selected for the PTT session. The region of the target user(s) is determined in step 636. In step 638, if the PTT request requires translation then the request is converted from the common format to the target format in step 640. The PTT request is next forwarded to regional inter-working components servicing the target user(s), which may be located on a different POP, and then to the target carrier.

When the session is complete, the custom gateway releases allocated resources and terminates the PTT session. For example, if the originating caller hangs up, Carrier 1 transmits a call release message 644a to the WWD architecture, which transmits a call release message 644b to Carrier 2. During the PTT session, CDRs and UDRs are collected by the WWD architecture and published to the billing clearinghouse 645 for subsequent settlement processing 646 to allocate charges for the session. The billing clearinghouse subsequently publishes an invoice 648a to Carrier 1 and an invoice 648b to Carrier 2, including the allocated charges.

An embodiment of the operation of the architecture of FIG. 11 is illustrated in FIG. 13. In step 670, a local PTT carrier routes sessions either internally or to a proxy server depending on the technologies of the originating and terminating entities. If the terminating entity has the same technology then the session is forwarded without translation. If the terminating entity and originating entity operate using different technologies, then the signaling bridge 654 translates the session into the common WWD protocol in step 672 and forwards the session to the WWD network. The WWD network performs any necessary address and name translation in step 674, determines the target location in step 676, selects xcoder for the session in step 678, selects media servers for the session in step 680, and identifies the WWD target region in step 682. The WWD architecture determines whether the terminating carrier (1) uses the same technology, and thus requires no translation, (2) requires translation, or (3) handles translation in the carrier network. If the terminating carrier includes a proxy and signaling bridge then the message may be forwarded to the carrier in the common WWD format. In step 690, the terminating carrier performs any necessary conversion from the WWD format to the terminating carrier's technology.

When the session is complete the WWD architecture releases allocated resources and terminates the PTT session. For example, if the originating caller hangs up, Carrier 1 transmits a call release message 692 to the WWD architecture, which transmits the call release message to Carrier 2. The WWD architecture publishes CDRs and UDRs 694 collected during the session to the billing clearinghouse, which performs settlement processing 696 to allocate charges for the session. The billing clearinghouse subsequently publishes invoices 698 to Carriers 1 and 2.

Figure 14:
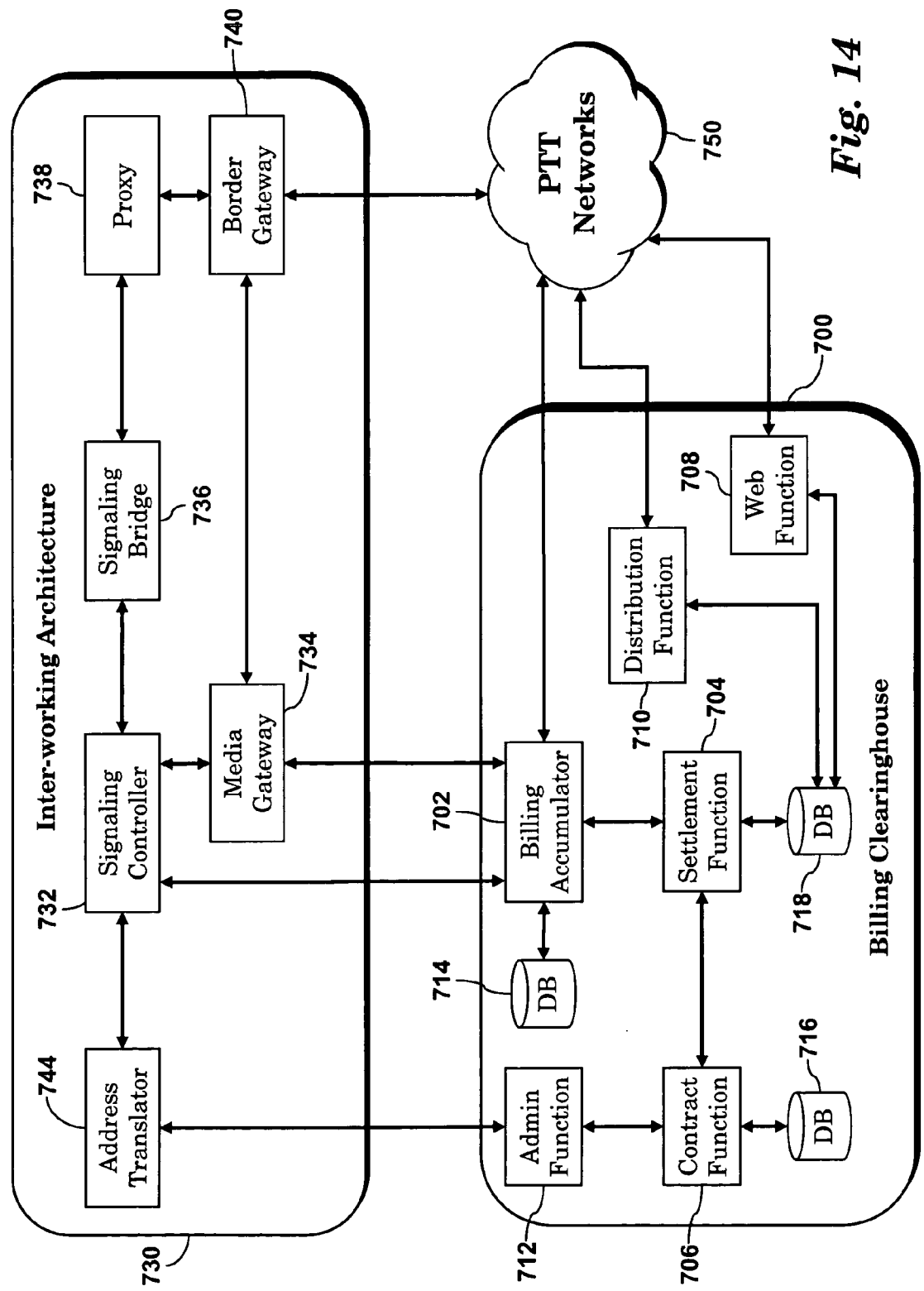
FIG. 14 is an embodiment of a billing clearinghouse architecture for a PTT inter-working architecture.

An embodiment of a billing clearinghouse architecture will now be described with reference to FIG. 14. A billing clearinghouse 700 includes a billing accumulator 702, a settlement function 704, a contract management function 706, a display/web function 708 and a distribution function 710. Each component of the billing clearinghouse 700 may be implemented as software or hardware on one or more servers.

The billing accumulator 702 receives PTT call data, including UDRs and CDRs, from the signaling controller 732 and signaling gateway 734 and applies settlement logic to PTT call data as defined by the settlement function 704. The billing accumulator 702 stores PTT call data in a database 714 adapted for failsafe operation and maintains the integrity of the raw PTT call data. In one embodiment, the billing accumulator 702 periodically retrieves PTT call data via secure FTP from the inter-working architecture 730.

Each PTT network 750 stores PTT call data for local PTT callers and bills its own subscribers through a local billing system (not shown). The billing accumulator 702 may also include an interface to the individual PTT networks 750, through which the billing accumulator 702 may receive CDRs/UDRs associated with single network PTT calls that include one or more roaming subscribers, for billing the roaming subscriber's home network and performing reconciliation and fraud analysis. The billing accumulator 702 may also transfer CDRs/UDRs between carriers for audit purposes.

The settlement function 704 transforms PTT call data from the billing accumulator 702 into inter-carrier billing data by applying negotiated rules and inter-carrier policies. The settlement function 704 queries the rules and policies for billing an associated PTT call from the contract management function 706. In one embodiment, each PTT call data record includes two or more associated PTT networks 750 that participated in the PTT call and will be billed for the use of the inter-working architecture 730. The costs of the PTT call may be split among the associated PTT networks according to negotiated rules between the PTT networks, and the rules established by the operator of the inter-working architecture. For example, the PTT carriers may have different billing models and an inter-working PTT call may be billed based on the duration of the PTT call, roaming charges, the number of pushes of the PTT button by individual participants, number of participants in the group, the number of carriers involved in the call, the number of transmitted bytes, allocated transcoding resources, and other defined charges. The billing data is stored in a database 718, from which the settlement function 704 generates settlement invoices for the PTT carriers. Billing data identifying each subscriber's transactions may be provided to each PTT carrier to pass along the costs to its subscribers.

The contract management function 706 stores and manages inter-carrier terms and conditions in the form of rules of logic for implementation by the settlement function 704 to perform reconciliation. The terms and conditions are negotiated between individual PTT carriers and may differ for each PTT call depending on negotiated billing criteria such as an identity of the originating PTT carrier, identity of the terminating PTT carriers, floor time associated with each PTT caller, call duration, and number of participating PTT callers connected through the inter-working architecture and other criteria discussed above The web function 708 provides individual carriers with secure online access to settlement invoices and PTT call data stored in database 718 for viewing and downloading. The distribution function 710 distributes settlement invoices to the carriers. In one embodiment, a secure FTP or SMTP server is used to exchange stored invoice data with the carriers, such as via ftp or email. The raw CDRs may also be accessed or distributed through a secured web FTP interface.

The administrative function 712 is connected to the address translator 744 via an interface for providing subscriber name translations to the billing clearinghouse 700. The administrative function 712 is also interfaced with the contract function 706 to provision the inter-carrier peering rules and tariffs for settlement function.

Figure 15:
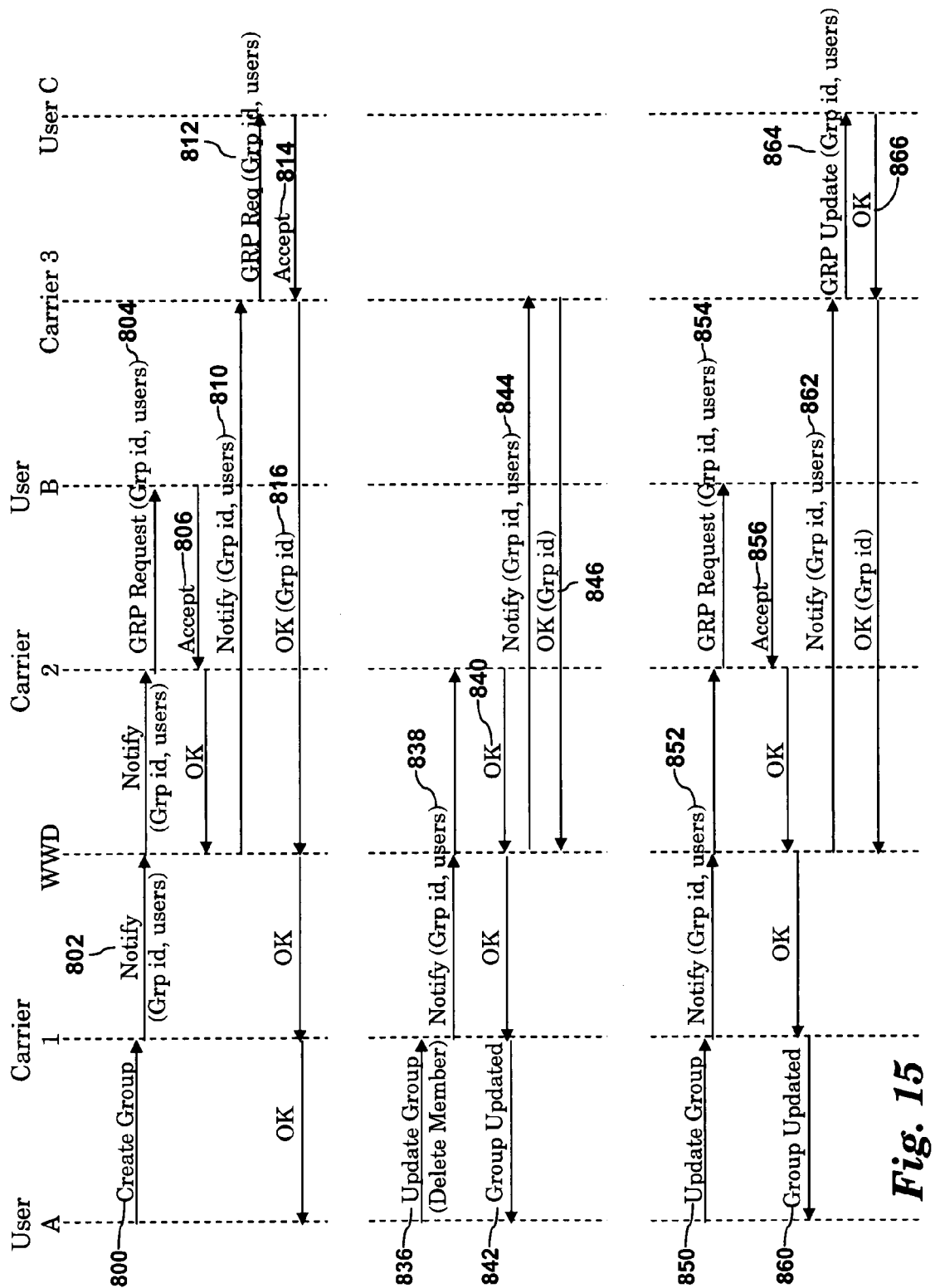
FIG. 15 illustrates an embodiment of inter-working group definition propagation.
Figure 16:
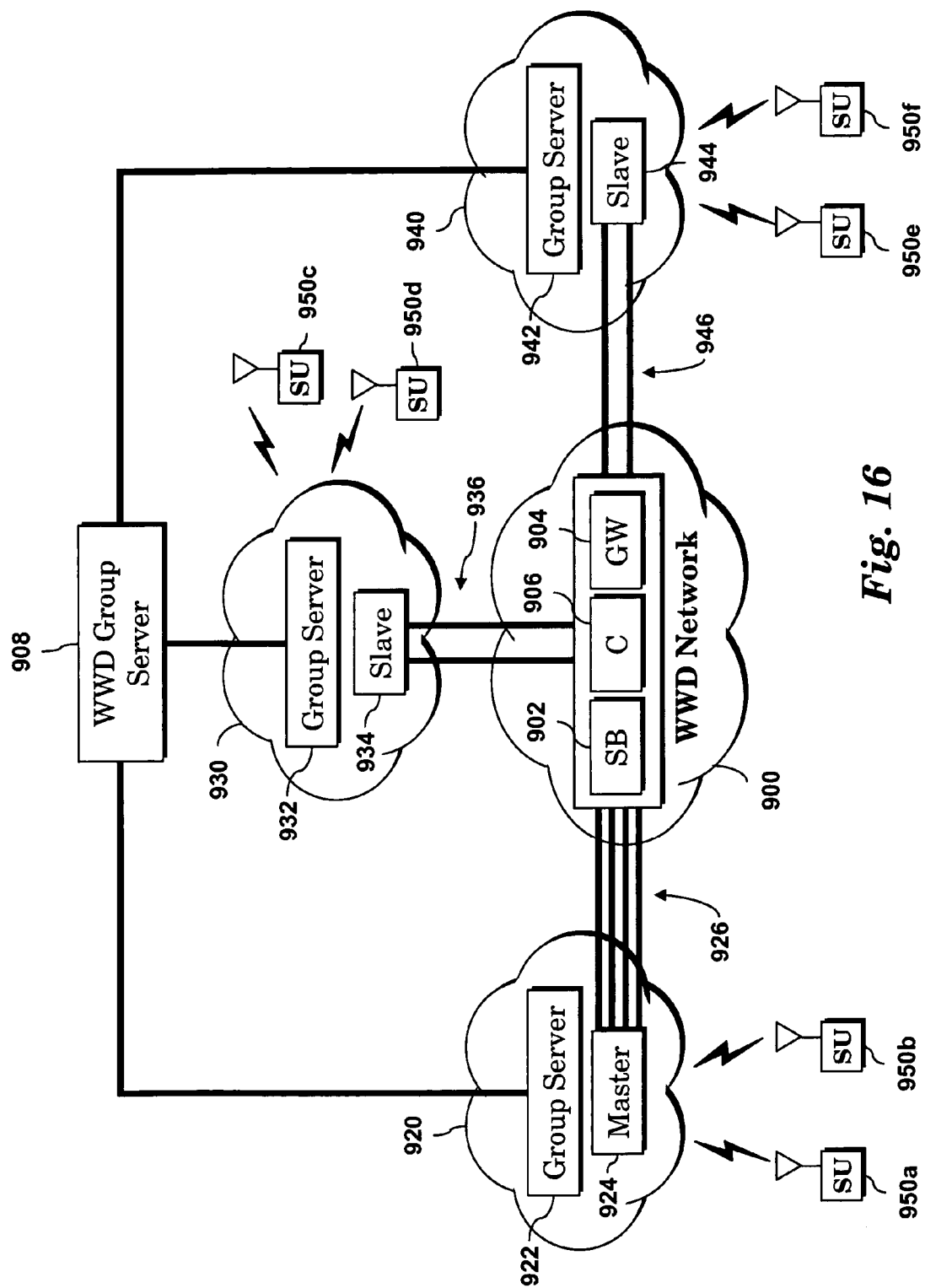
FIG. 16 illustrates an embodiment of an inter-working group call architecture.

Referring to FIGS. 15 and 16, embodiments of a call flow for defining and updating an inter-working group will now be described. In this embodiment, the WWD architecture facilitates group definition propagation across multiple carriers. In step 800, User A creates a group on a subscriber unit, such as by selecting names from a contacts list or entering contact information of a proposed group member, and assigning a group name or identifier. As illustrated, User A creates a group that include User B and User C. The group information is transmitted to User A's servicing carrier, Carrier 1. Carrier 1 determines that User B and User C are external subscribers and transmits a new group notification message to the WWD network (step 802). The group notification message includes a group identifier and an identifier of each group member. In one embodiment, the group identifier is assigned by Carrier 1. The WWD network may assign an inter-working group id for identification of the group within the WWD network, or in an alternative embodiment may assign a WWD group id for use by all participating carriers.

The WWD network identifies the domain of User B and transmits a group invite request to User B through Carrier 2 (step 804). If User B accepts the invitation to join the group, then an accept message (806) is returned to Carrier 2, which notifies the WWD network. Similarly, the WWD network transmits a group invite request to User C through Carrier 2 (steps 810 & 812), and an accept message (814) is returned to Carrier 3, which notifies the WWD network (step 816), which in turn notifies Carrier 1 that the group definition was successful. Carrier 1 subsequently notifies User A. In one embodiment the carriers (Carriers 1, 2 & 3) and the WWD network each assign their own group identifiers, and the WWD network stores information mapping the carrier group identifiers to the WWD network group identifier. Communications between the WWD network and each carrier would use a group identifier that is recognizable to the carrier network.

User A may also delete a group member, such as User B, from the defined group. User A notifies Carrier (step 836) of the deletion from the group, and Carrier 1 notifies the WWD network (step 838). The WWD network then notifies Carrier 2 that User B is being deleted. Carrier 2 returns an acknowledgement (step 840) to the WWD network, which notifies the Carrier 1. Carrier 1 then notifies User A that the group has been updated in step 842. The WWD network updates its stored group definition and also notifies the other participating carrier networks of the update to the group definition. In step 844, the WWD network notifies Carrier 3 of the new definition, and Carrier 3 returns an acknowledgment message (846). The carrier networks may also notify each user of the group update.

User A may also add new members to the group definition, such as User B. In step 850, User A updates the group members and Carrier 1 is notified of the change. Carrier 1 notifies the WWD network in step 852 in a message identifying the group iD and the current group members. The WWD network transmits a group invite request 854 to new User B through Carrier 2, and if accepted (step 856) returns an acknowledgement message to Carrier 1. Carrier 1 notifies User A of the updated group definition in step 860. The WWD network also updates its stored group definition and notifies the member carriers of the updated definition (step 862). Carrier 3 updates the group definition and transmits a new group definition to User D (step 864). User D then acknowledges the receipt of the new group definition (step 866).

It will be appreciated that the call flows illustrated in FIG. 15 are exemplary and that alternative call flows may be used in accordance with embodiments of this invention.

In FIG. 16, one embodiment for supporting PTT group calls spanning multiple PTT carriers is illustrated. In a conventional group call spanning multiple servers on a single carrier network, there may be a master/slave relationship between the originating and the terminating call controllers. The master controller maintains control over of the group session and directs the slave controllers based on user events (such as floor requests) to forward the events to the user and update the session as needed.

In the illustrated embodiment, a WWD network 900 includes a signaling bridge 902, a controller 904, a gateway 906 and a WWD group server 908. The WWD network 900 acts as a pass-through to facilitate the group calls between dispatch networks 920, 930 and 940. The dispatch network 920 includes a group server 922 and a dispatch call controller 924. The dispatch network 930 includes a group server 932 and a call controller 934, and the dispatch network 940 includes a group server 942 and a call controller 944. In this embodiment, the call controller 924 in the originating dispatch network 920 functions as a master controller for communications originating from dispatch network 920. The master controller 924 manages talker arbitration, floor allocation and media duplication. The controllers 934 and 944 function as slave controllers for calls originating from the WWD network 900. The WWD network 900 handles translation and routing of the session signaling and media to the appropriate terminating networks 930 and 940.

In operation, a user 950a selects members 950b-f from a phone book application and initiates a group call. The call controller 924 in the originating carrier 920 determines that certain group members are cross carrier and sets up call legs 926 for each external member in the group. The call controller 924 duplicates voice and packet data for each group member and forwards the messaging associated with members of other carriers to the WWD network 900. The WWD network 900 performs any necessary translation and transcoding and forwards the messaging for each group member (see 936 and 946) to the appropriate terminating carriers 930 and 940. In one embodiment, the WWD network 900 is unaware of the association between the various private call legs of the group call. In an alternate embodiment, the WWD network 900 may be able to group the private legs based on the group id included in incoming private leg signaling and provide value added services. The terminating PTT servers 934 and 944 function in a slave mode and forward the messages arriving from the WWD network to the respective end users 950*c-d* and 950*e-f*, respectively. The master controller 924 in the originating carrier 920 is responsible for arbitrating the floor across active members of the group.

Figure 17A:
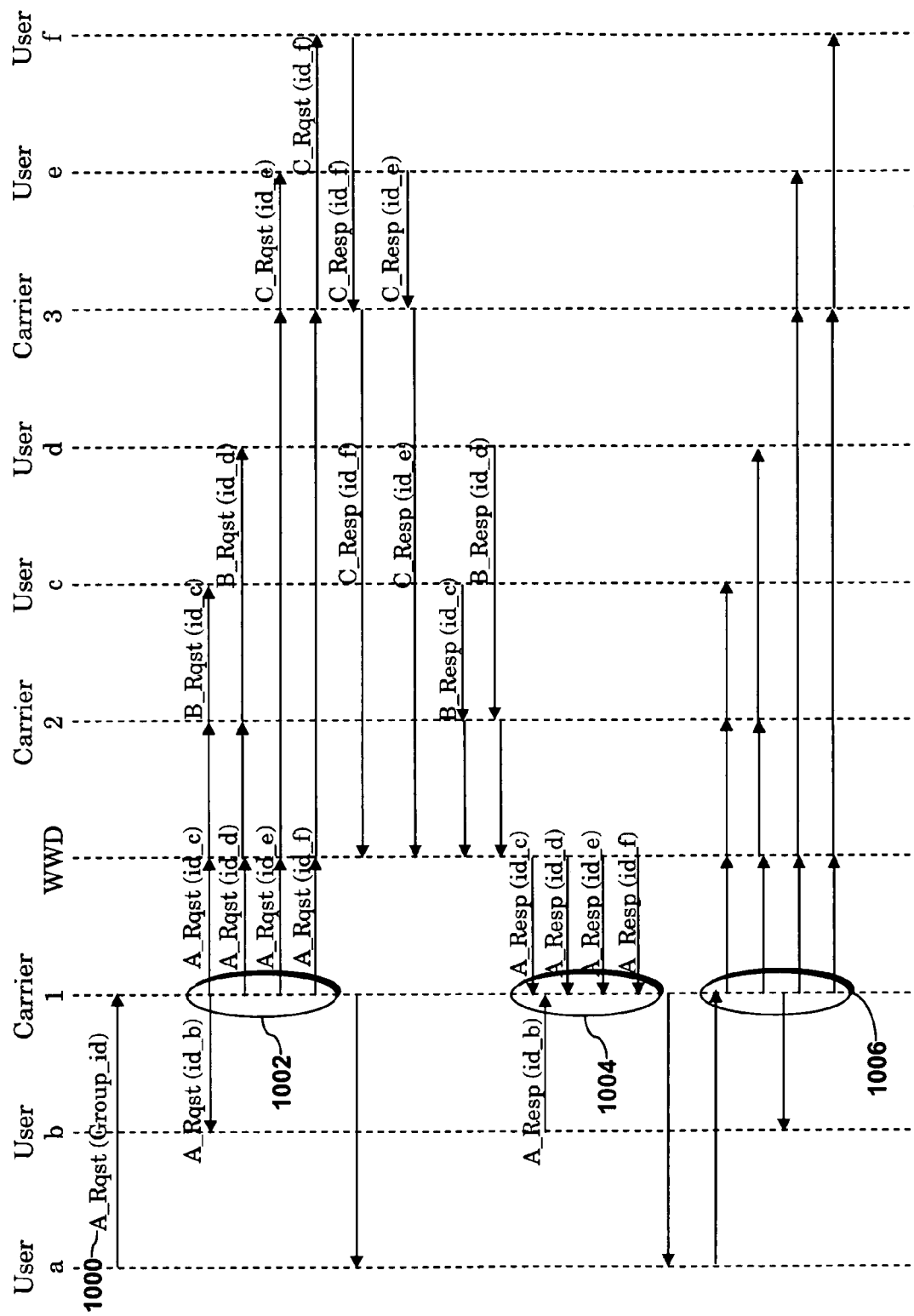
FIGS. 17a-b are call flows illustrating an embodiment of an inter-working group session in accordance with the architecture of FIG. 16.
Figure 17B:
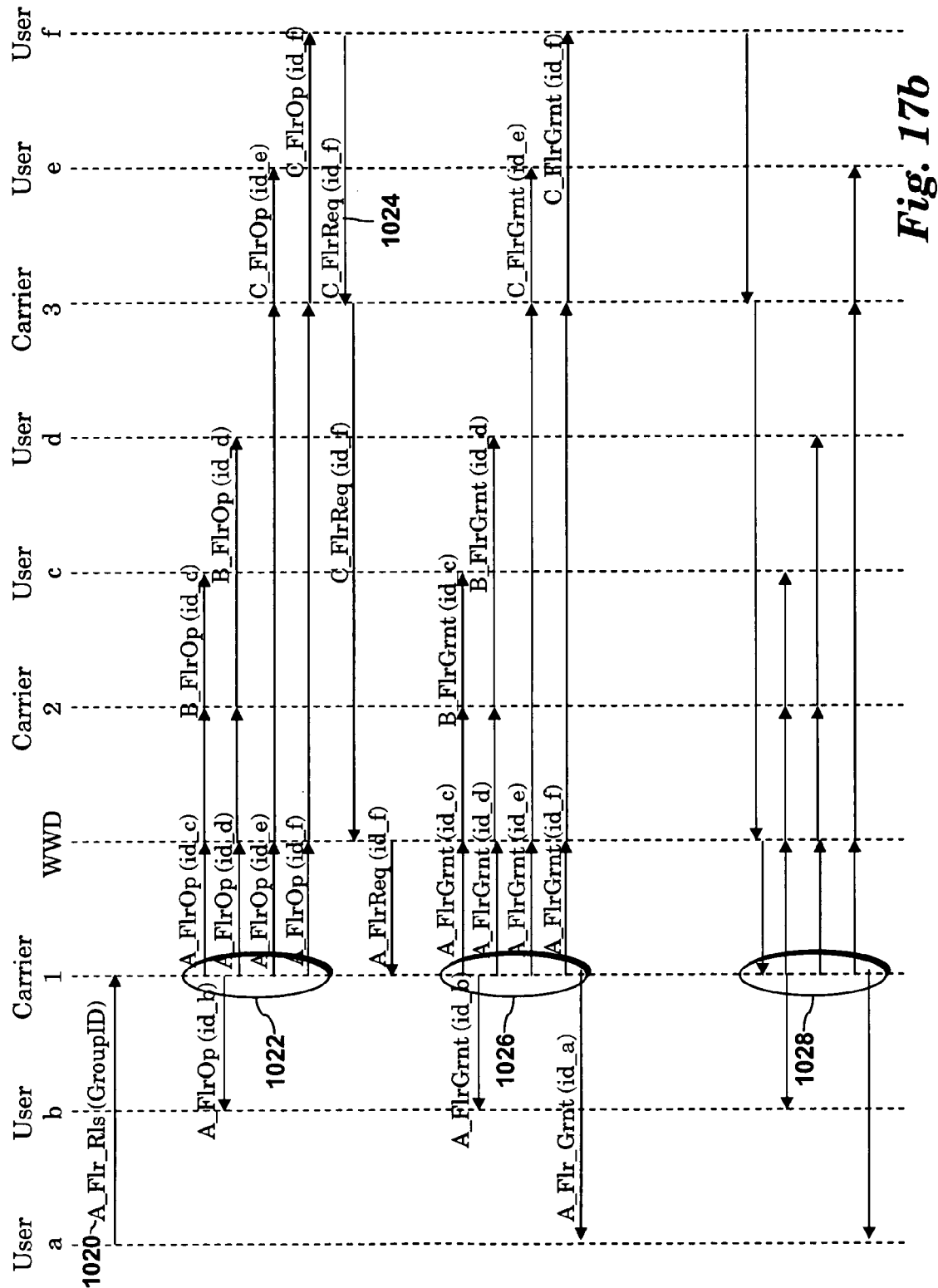

Referring to FIGS. 17*a-b*, an embodiment of a call flow for FIG. 16 will now be described in further detail. In FIG. 17*a*, User_a initiates a group call, such as by selecting a predefined group on subscriber unit 950*a* and pressing a PTT button. The group call request, including the group id, is transmitted to Carrier 1 in step 1000. In step 1002, Carrier 1 identifies the members of the group and transmits a request to each group member to join the call. As illustrated, individual messages are sent to Carrier 2 for each of User_c and User_d, and to Carrier 3 for each of User_e and User_f. Each carrier communicates the request to its target users and awaits a response from each target user. Carrier 1 communicates with User_b directly. If a target user is available to join the group call, then a response is returned to the respective carrier networks, which return the responses to the WWD network. The WWD network forwards the responses to Carrier 1 which receives the responses and completes call setup in step 1004. During group communications while User_a has the floor (step 1006), Carrier 1 receives voice communications from User_a, duplicates the voice communications and forwards to each of the participating users through the WWD network and their respective carrier networks as illustrated.

Referring to FIG. 17*b*, when User_a releases the floor, a floor release message is transmitted to Carrier 1 (step 1020). Carrier 1 then transmits a floor_open message to each participating user. Carrier 1 transmits the floor_open message directly to User_b, and transmits the floor_open message to the other users through the WWD network, which forwards the message to the users' respective carriers. As illustrated, with the floor open User_f requests the floor in step 1024. The request is forwarded to Carrier 3, which forwards the message to the WWD network, which in turn forwards the floor request message to Carrier 1. In step 1026, Carrier 1 grants the floor to User_f and transmits a floor_grant message to each participating user. While User_f has the floor (step 1028), voice communications are transmitted from User_f to Carrier 3, which forwards the communications to the WWD network, which in turn forwards the voice communications to Carrier 1. Carrier 1 duplicates the voice communications and forwards the voice communications to each of the other users through the WWD network and their respective carrier networks as illustrated.

Figure 18:
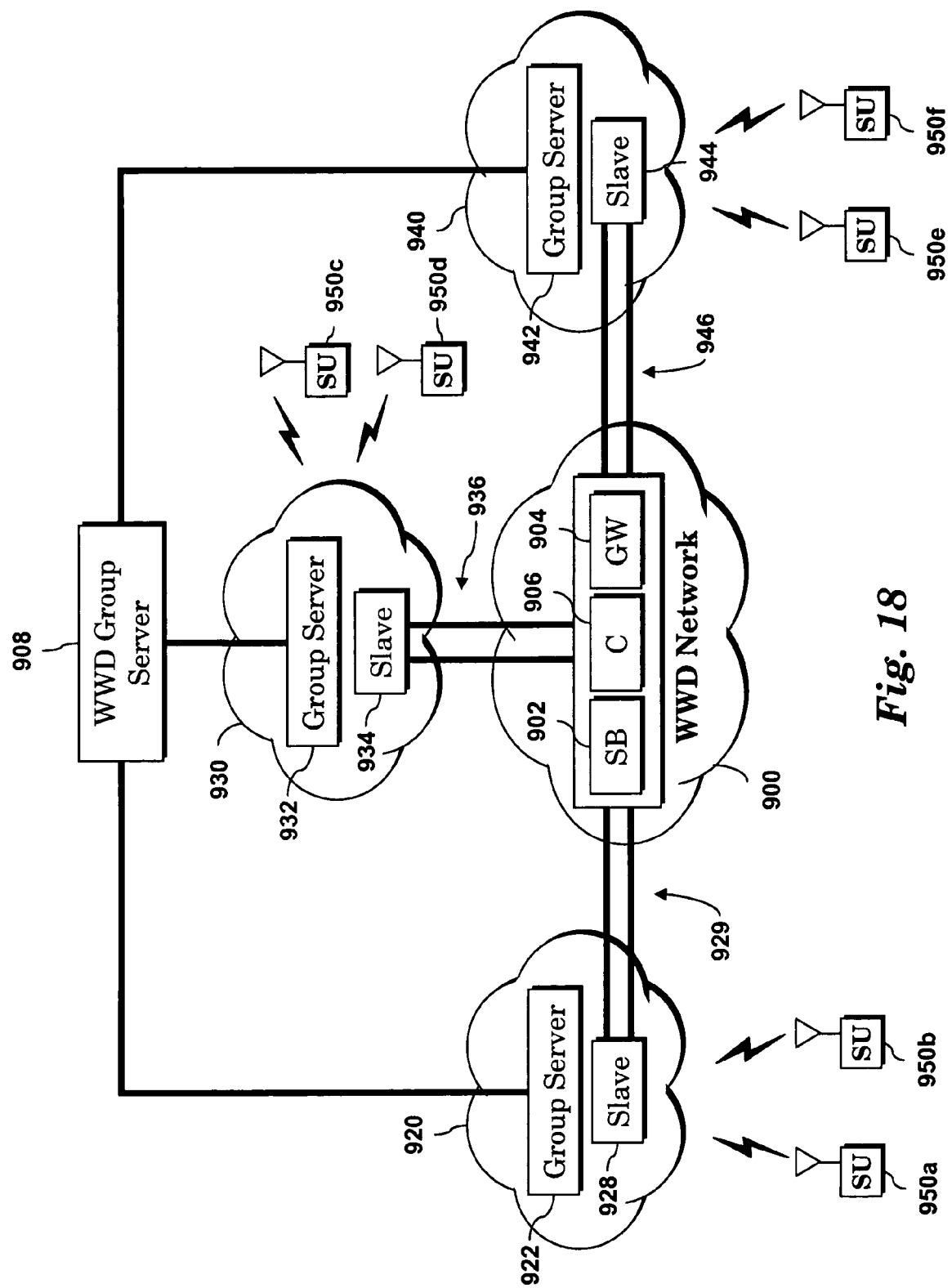
FIG. 18 illustrates an embodiment of an inter-working group call architecture.

Referring to FIG. 18, another embodiment of a group call architecture will be described. In this embodiment, the PTT controller 906 in the WWD network 900 is a master controller, managing technology translation, talker arbitration, floor allocation, media duplication and delay smoothing. The originating network 920 and the terminating networks 930 and 940 are responsible for routing the session signaling and media to the corresponding end user 950*a-f*. Upon determining that the requested group call spans multiple carriers, the originating PTT server 928 forwards the group call request to the WWD network 900. The WWD network accesses the group database to obtain the member ids for the group members (if the member ids are not included in the call request) and sets up private call legs (929, 936 & 946) to each member of the group. The WWD network 900 performs any necessary translation and forwards the messaging for each user to its respective PTT server (928, 934 and 944, respectively). The WWD network 900 is the master controller of both the signaling and media planes and arbitrates floor allocation across various active members of the group. The originating and the terminating PTT servers operate in the slave mode by forwarding the messages emanating from the WWD network to the members of the group call.

In contrast to the embodiment of FIG. 16, the WWD network of FIG. 18 maintains control of the group call and talker arbitration associated with that call, and has the potential to enable group call based value added features to derive higher operating margins from the WWD infrastructure. Moreover, this architecture is conducive for end-users who are roaming outside their network. A drawback with this embodiment is that the carrier PTT networks proxy the cross-carrier group calls to WWD infrastructure. This may require modifying the PTT infrastructure of the carrier networks 920, 930 and 940. The embodiment of FIG. 16 provides a more simple architecture for cross carrier group calls, but the end-to-end private call legs, from originating to terminating carriers, are inefficient from a resource utilization perspective.

Figure 19A:
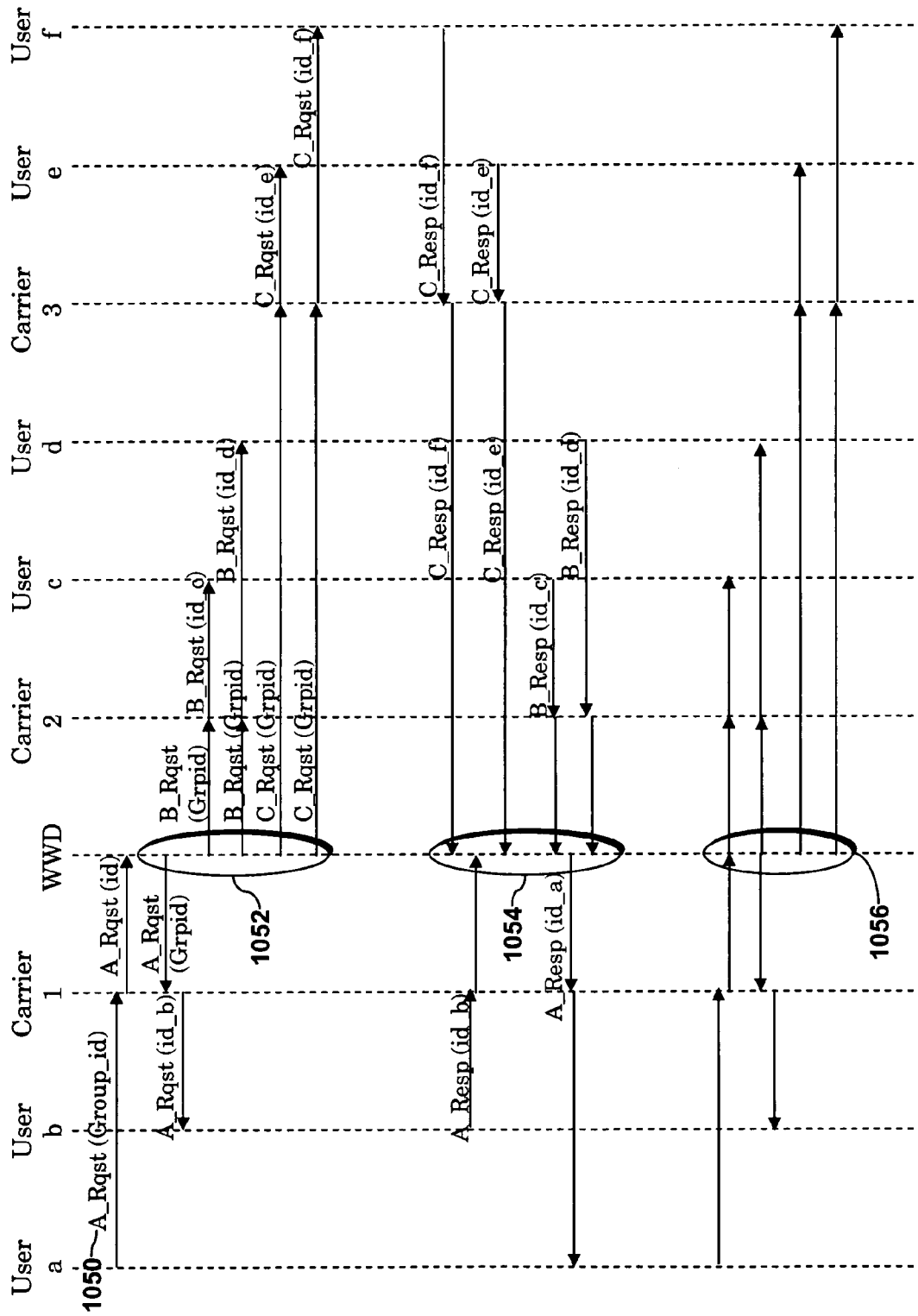
FIGS. 19a-b are call flows illustrating an embodiment of an inter-working group session in accordance with the architecture of FIG. 18.
Figure 19B:
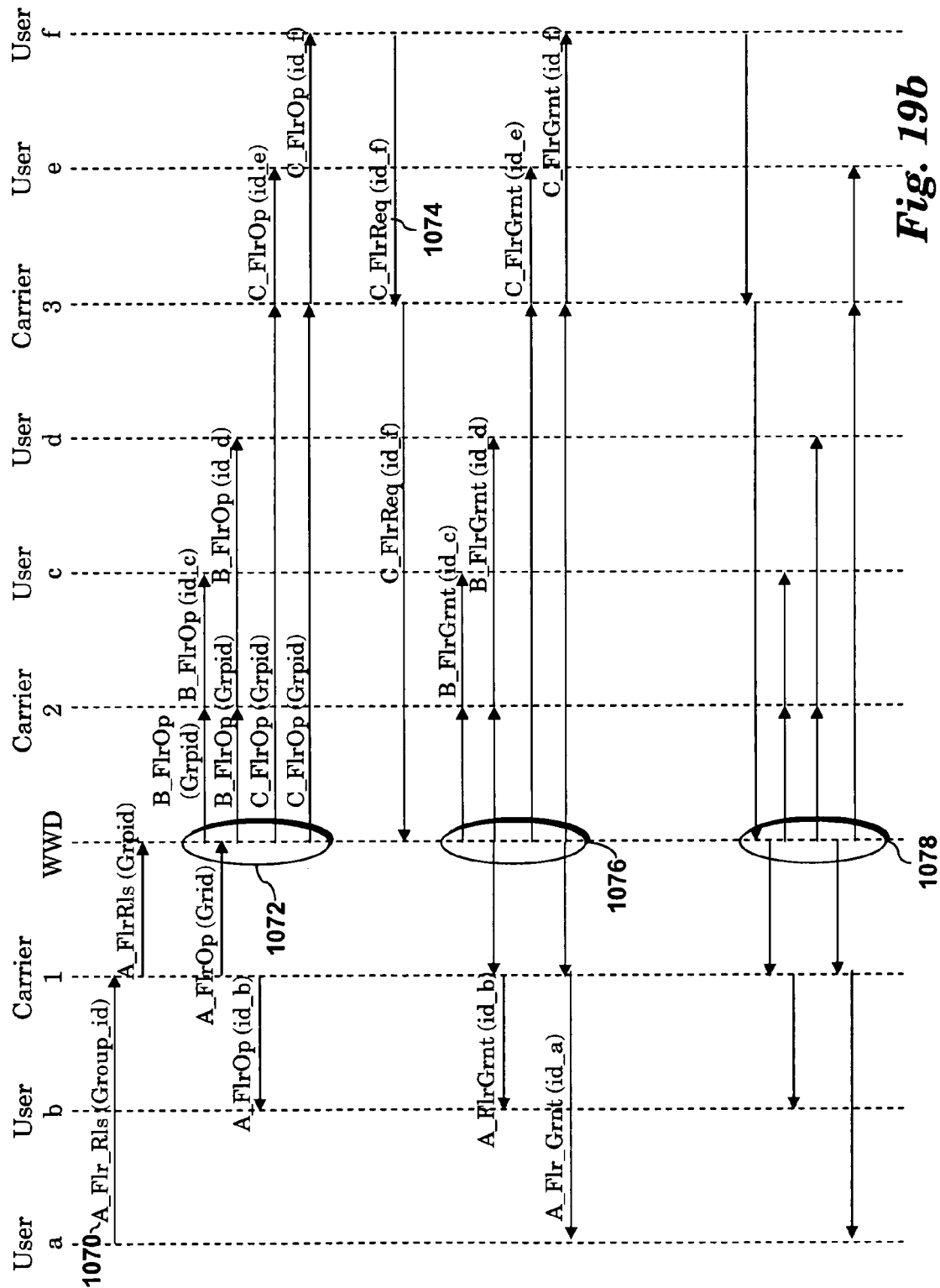

Referring to FIGS. 19*a-b*, a embodiment of a call flow for the architecture of FIG. 18 will be described in further detail. In FIG. 19*a*, User_a initiates a group call, and a group call request, including the corresponding group id, is transmitted to Carrier 1 in step 1050. Carrier 1 determines that the requested call is a cross carrier call and transmits the request to the WWD network as illustrated. In step 1052, the WWD identifies the members of the group and transmits a request to each group member to join the call. As illustrated, individual messages are sent to Carrier 1 for User_b, Carrier 2 for each of User_c and User_d, and to Carrier 3 for each of User_e and User_f. Each carrier communicates the request to its target user(s) and awaits a response from each target user. If a target user is available to join the group call, then a response is returned to the respective carrier networks, which return the responses to the WWD network in step 1054. The WWD network completes call setup and notifies User_a through Carrier 1. During group communications while User_a has the floor (step 1056), Carrier 1 receives voice communications from User_a and forwards the voice communications the WWD network. The WWD network duplicates and forwards the voice communications to each of the participating users through their respective carrier networks as illustrated.

Referring to FIG. 19*b*, when User_a releases the floor, a floor release message is transmitted to Carrier 1 (step 1070), which transmits a floor release message to the WWD network. In step 1072, the WWD network transmits a floor_open message to each participating user through their respective carriers. As illustrated, with the floor open User_f requests the floor in step 1074. The request is forwarded to Carrier 3, which forwards the message to the WWD network. In step 1076, the WWD network grants the floor to User_f and transmits a floor_grant message to each participating user through their respective carriers. While User_f has the floor (step 1078), voice communications are transmitted from User_f to Carrier 3, which forwards the communications to the WWD network. The WWD network duplicates the voice communications and forwards the voice communications to each of the other users through their respective carrier networks as illustrated.

Figure 20:
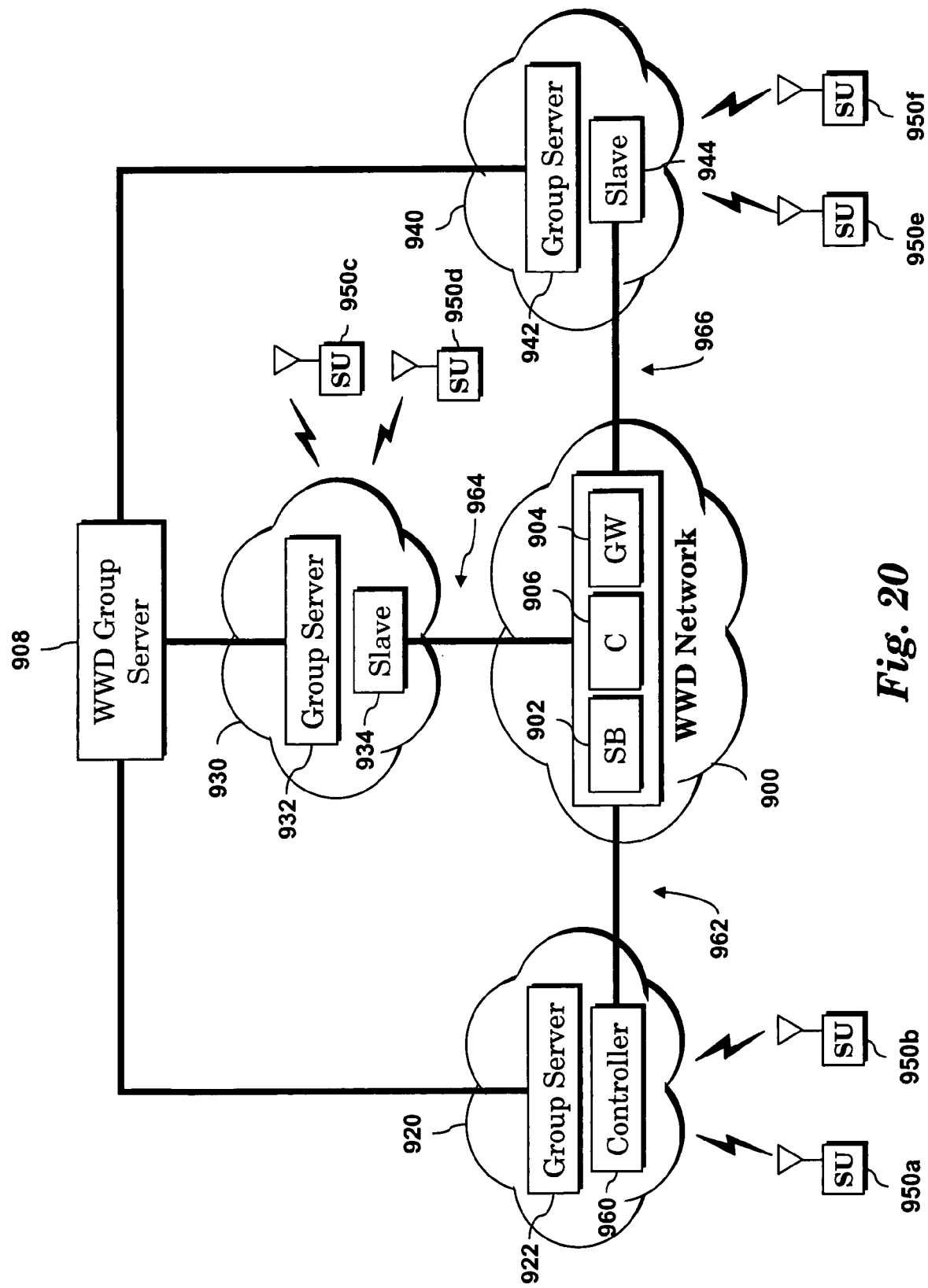
FIG. 20 illustrates an embodiment of an inter-working group call architecture.

Referring to FIG. 20, another embodiment of a group call architecture will be described. In this embodiment, media replication is performed intelligently at each terminating network rather than at the originating network. The WWD network 900 translates and duplicates incoming signaling and media on a per carrier basis (see 962, 964 and 966), and the participating carrier replicates the messages for each member belonging to its network. The WWD network 900 creates and receives a single message stream (see 960, 962 & 964) for each carrier network involved in a group call and the controllers 960, 934 and 944 duplicate for the users belonging to their own networks. The controller 960 may be configured to operate as either a master or slave controller. As a slave controller, cross carrier group communications received from the user 950*a* are forwarded to the WWD network 900 for processing, which may then transmit a corresponding message to user 950*b* and users 950*c-f*. As a master controller, cross carrier communications received from the user 950*a* are processed by the controller 960 and a corresponding message is sent to user 950*b* by the controller 960, and to the WWD network for forwarding to the carrier networks 930 and 940.

Figure 21A:
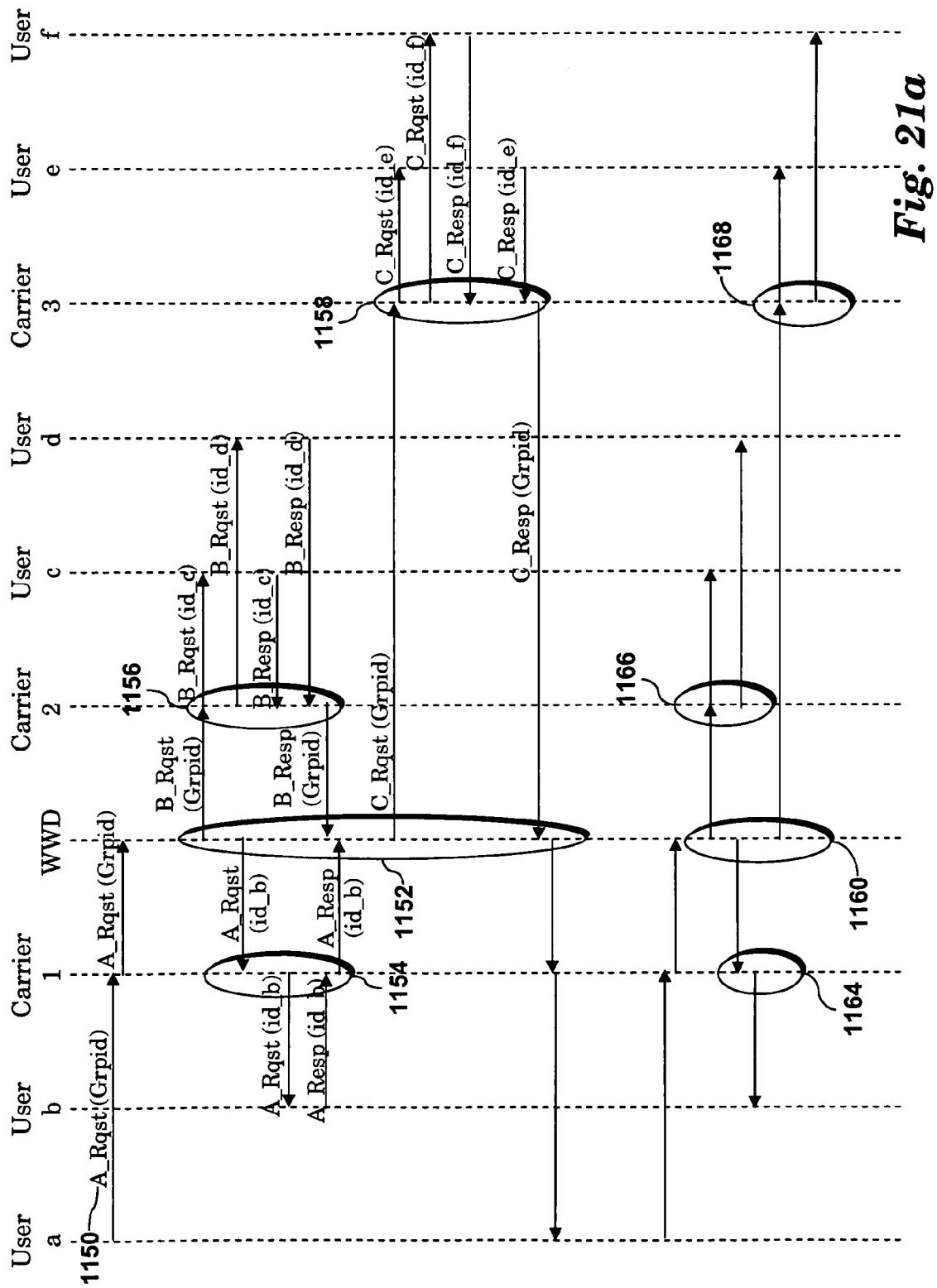
FIGS. 21a-b are call flows illustrating an embodiment of an inter-working group session in accordance with the architecture of FIG. 20.
Figure 21B:
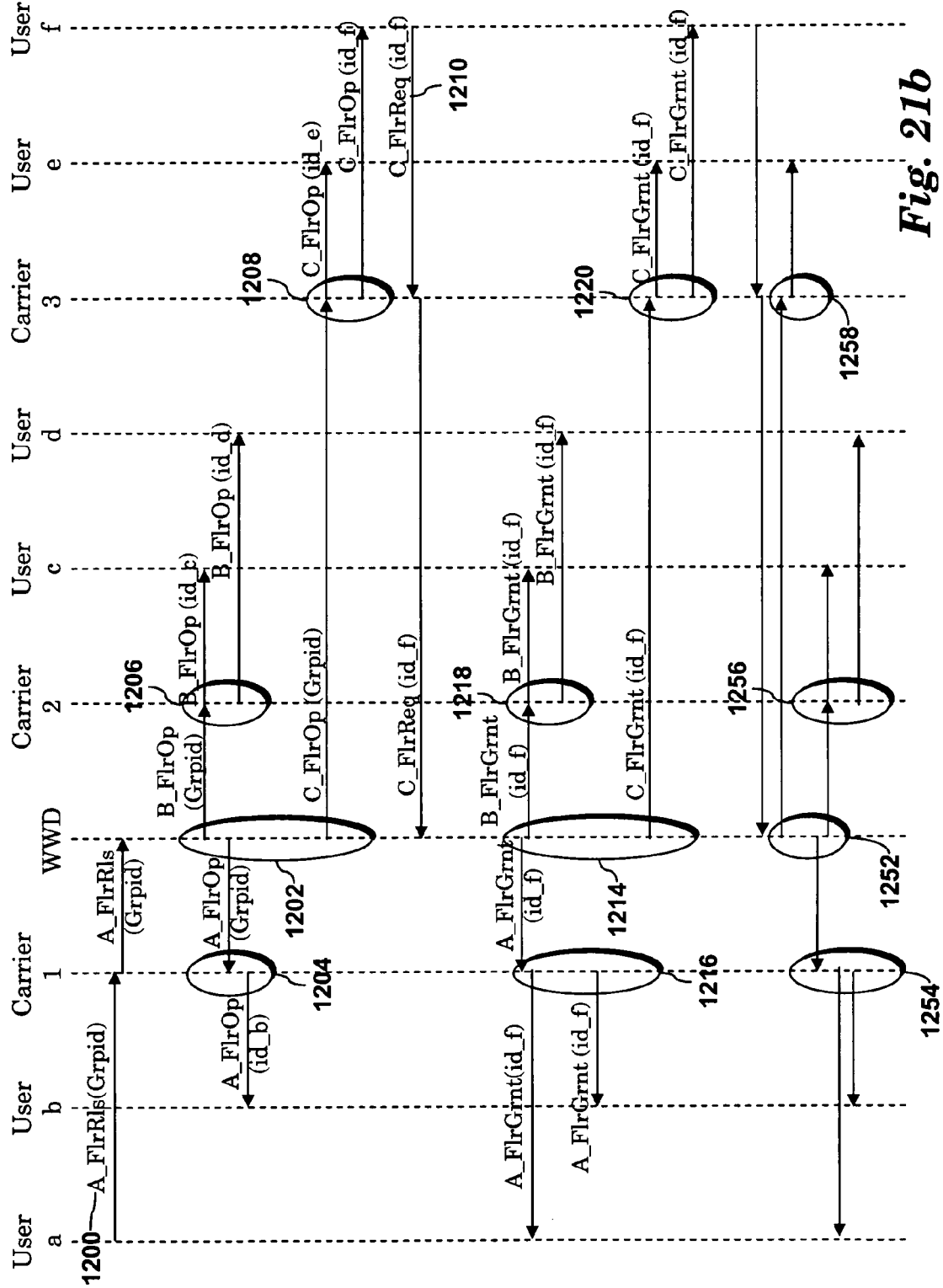

Referring to FIGS. 21*a-b*, a embodiment of a call flow for the architecture of FIG. 20, in which the controller 960 operates in slave mode, will be described in further detail. In FIG. 21*a*, User_a initiates a group call, and a group call request, including the corresponding group id, is transmitted to Carrier 1 in step 1150. Carrier 1 determines that the requested call is a cross carrier call and transmits the request to the WWD network as illustrated. In step 1152, the WWD network identifies the members of the group and transmits a request to each participating carrier for the identified group member to join the call. As illustrated, individual messages are sent to Carrier 1, Carrier 2 and Carrier 3. Each carrier communicates the request to each of its target user(s), and if a target user is available to join the group call, a response is returned to the respective carrier networks, which return the responses to the WWD network in step 1154, 1156 and 1158, respectively. The WWD network completes call setup and notifies User_a through Carrier 1. During group communications while User_a has the floor, Carrier 1 receives voice communications from User_a, and forwards the voice communications to its local target users, such as User_b, and to the WWD network for delivery to cross carrier target users. The WWD network duplicates the voice communications for each target carrier and forwards the voice communications to each of the participating target carrier in step 1160. Each target carrier receives the voice communications and duplicate the voice communications for each target user in steps 1164, 1166 and 1168, respectively.

Referring to FIG. 21*b*, when User_a releases the floor, a floor release message is transmitted to Carrier 1 (step 1200), which transmits a floor release message to the WWD network. In step 1202, the WWD network transmits a floor_open message to each participating carrier. Each carrier duplicates and transmits the floor_open message to each target user on the respective carrier network (steps 1204, 1206 & 1208, respectively). As illustrated, with the floor open User_f requests the floor in step 1210. The request is forwarded to Carrier 3, which forwards the message to the WWD network. In step 1214, the WWD network grants the floor to User_f and transmits a floor_grant message to each participating carrier. Each carrier network duplicates and transmits the floor_grant message for each of the carrier's target users (steps 1216, 1218 and 1220, respectively). While User_f has the floor, voice communications are transmitted from User_f to Carrier 3, which forwards the communications to the WWD network. The WWD network receives the voice communications and duplicates and transmits the voice communications to each participating carrier in step 1252. The respective carriers receive, duplicate and transmit the voice communications to each of the carrier's target users (steps 1254, 1256 and 1258, respectively).

During group calls as illustrated in FIGS. 15-21*b*, the WWD network creates call data records and usage detail reports for communications facilitated through the WWD network. After call completion, the billing clearinghouse aggregates the CDRs and UDRs, performs settlement processing to allocate charges for the group call to participating carriers, and publishes an invoice to each participating carrier.

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. A network for inter-working a plurality of dispatch networks, at least two of the dispatch networks having incompatible technologies, the network comprising:

a core inter-working network including an inter-working group server;

a plurality of points-of-presence connected to the core inter-working network, wherein at least one of the plurality of points-of-presence includes a signaling bridge adapted to translate dispatch session messages received from an originating dispatch network into a common signaling format before session processing; and a plurality of border gateways interfacing each of the dispatch networks to at least one of the plurality of points-of-presence;

wherein the inter-working group server provides group management services to at least one of the plurality of points-of-presence.

2. The network of claim 1 wherein the core inter-working network further includes a centralized database storing call detail records and usage data reports relating to dispatch sessions implemented across the network; and a billing clearinghouse for receiving the call detail records and usage data reports and generating invoices for each of the dispatch networks.

3. The network of claim 1 wherein at least one point-of-presence is adapted to translate signals from the common signaling format into a format compatible with a target dispatch network.

4. The network of claim 1 wherein the at least one point-of-presence further includes a proxy server adapted to receive an incoming dispatch request from the originating dispatch network and determine whether translation is required between signaling formats of the originating and target dispatch networks, wherein translation by the signaling bridge is performed when the proxy server determines that translation is required, and wherein dispatch session messages are not translated by the signaling bridge when the proxy server determines that translation is not required.

5. The network of claim 1 wherein the inter-working group server is adapted to communicate with at least one group server in each of the dispatch networks.

6. The network of claim 1 wherein a first of the dispatch networks is an iDEN network and a second of the dispatch networks is a high performance push-to-talk network, and wherein the network is adapted to facilitate group dispatch communications between a group of subscribers on the iDEN network and a group subscribers on the high performance push-to-talk network.

7. An inter-working architecture for facilitating dispatch communications between a group of dispatch devices spanning a plurality of dispatch networks, each dispatch network having a separate administrative domain and operating on at least one of a plurality of technologies, comprising:
   a plurality of interfaces facilitating communications with each of the dispatch networks;
   a signaling bridge adapted to convert session messages and signaling messages between the plurality of dispatch networks;
   a signaling controller interfaced with the signaling bridge, the signaling controller adapted to manage a dispatch session between an originating dispatch network and at least one target dispatch network;
   a media gateway interfaced with the signaling controller, the media gateway adapted to convert real-time media between the originating dispatch network and the target dispatch network; and
   a group server interfaced with at least one group server in each of the plurality of dispatch networks, the group server managing inter-working group calls.

8. The inter-working architecture of claim 7 further comprising a proxy server interfaced with the signaling bridge and the signaling controller, the proxy server adapted to facilitate a communication between the originating and target dispatch networks without translation when the originating and target dispatch networks use compatible dispatch technologies, wherein the proxy server routes an incoming dispatch session to the signaling bridge for translation when the originating and target dispatch networks use incompatible technologies.

9. The inter-working architecture of claim 7 wherein the interfaces include a border gateway that manages communications between the inter-working architecture and the dispatch networks.

10. The inter-working architecture of claim 7 further comprising a billing clearinghouse adapted to collect call data for a dispatch session between two or more dispatch networks, reconcile the collected data and create inter-working invoices for the dispatch session.

11. The inter-working architecture of claim 10 wherein the signaling controller facilitates the storage of call data records, in a regional database, associated with a dispatch call between two or more of the dispatch networks, and wherein the billing clearinghouse uses the stored call detail records to create inter-working invoices.

12. The inter-working architecture of claim 11 wherein the media gateway facilitates the storage of usage detail reports associated with a dispatch group call between two or more of the dispatch networks, and wherein the billing clearinghouse uses the stored usage detail reports to create inter-working invoices.

13. The inter-working architecture of claim 12 wherein the border gateway facilitates the storage of usage detail reports associated with inbound and outbound traffic between the dispatch networks.

14. A method for monetizing inter-working a plurality of disparate dispatch networks, each dispatch network providing dispatch services to a plurality of subscriber units, comprising the steps of:
   receiving a dispatch session request from an originating dispatch network, the dispatch session request identifying a group of the subscriber units spanning a plurality of target dispatch networks;
   processing, in a point-of-presence, the dispatch session request, including allocating signaling and media resources;
   forwarding the dispatch session request to a border gateway associated with each of the target dispatch networks;
   facilitating the group session between the originating dispatch network and the target dispatch networks; and
   generating an invoice for each of the originating dispatch network and target dispatch networks, including charges for facilitating the group session.

15. The method of claim 14 wherein signaling resources are allocated in a plurality of points-of-presence, each point-of-presence generating dispatch call data records and usage data records for the group session.

16. The method of claim 15 further comprising aggregating the generated dispatch call data and usage data for the group session and applying settlement logic to the aggregated dispatch call data to produce billing data for each of the originating dispatch network and the target dispatch networks.

17. The method of claim 16 wherein the settlement logic includes a set of criteria comprising at least one of a number of PTT button pushes requesting a session floor, a number of regions, a size of participating carriers, a group size for the session, a number of carriers involved in the session, a number of bytes transmitted, an identity of transcoding resources allocated, and an identify and duration of inter-working applications used.

18. The method of claim 17 further comprising:
   receiving a request for an inter-working application; and
   executing the inter-working application during the session,
   wherein the invoice includes charges for the use of the inter-working application.

19. The method of claim 14 wherein the signaling resources are allocated in a first point-of-presence and media resources are allocated in a second point-of-presence, each point-of-presence generating dispatch call data for the group session.

* * * * *